(12) United States Patent
Sharma

(10) Patent No.: US 9,300,351 B2
(45) Date of Patent: *Mar. 29, 2016

(54) LOW POWER RADIO COMMUNICATION SYSTEM

(71) Applicant: SecureALL Corporation, Mountain View, CA (US)

(72) Inventor: Arun Kumar Sharma, Cupertino, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,993

(22) Filed: Sep. 11, 2014

(65) Prior Publication Data

US 2014/0376602 A1 Dec. 25, 2014

Related U.S. Application Data

(63) Continuation of application No. 13/747,362, filed on Jan. 22, 2013, now Pat. No. 8,861,576, which is a continuation of application No. 12/500,587, filed on Jul. 9, 2009, now Pat. No. 8,472,507.

(60) Provisional application No. 61/079,435, filed on Jul. 9, 2008.

(51) Int. Cl.
*H04B 1/38* (2015.01)
*H04B 1/401* (2015.01)
(Continued)

(52) U.S. Cl.
CPC .................. *H04B 1/401* (2013.01); *H04B 1/16* (2013.01); *H04W 52/02* (2013.01); *H04W 52/0229* (2013.01); *H04W 52/0235* (2013.01); *Y02B 60/50* (2013.01)

(58) Field of Classification Search
USPC ........................................................ 375/220
See application file for complete search history.

(56) References Cited

U.S. PATENT DOCUMENTS 4,071,713 A 1/1978 Sencer
4,200,871 A 4/1980 Roeder et al.
(Continued)

FOREIGN PATENT DOCUMENTS

JP 2005-286745 10/2005

OTHER PUBLICATIONS

PCT International Search Report and the Written Opinion mailed Feb. 19, 2010, in related International Application No. PCT/US2009/050180.

(Continued)

*Primary Examiner* — Dac Ha
*Assistant Examiner* — Janice Tieu
(74) *Attorney, Agent, or Firm* — Haynes and Boone, LLP

(57) ABSTRACT

A method significantly reduces the average power for radio communication in a communication system, such as a system that has applications requiring low communication latency. The method may use a low power radio communication circuit (e.g., a non-heterodyne receiver) to wait for a communication request, taking advantage of the low power consumption of the radio communication circuit. Subsequent to receiving and validating the communication request, the communication system may switch to a more efficient—but higher power—communication circuit. Thus, effective communication is achieved without making undesirable tradeoffs, such as reduced sensitivity.

17 Claims, 47 Drawing Sheets

(51) Int. Cl.
*H04W 52/02* (2009.01)
*H04B 1/16* (2006.01)

(56) References Cited

U.S. PATENT DOCUMENTS

| | | | |
|---|---|---|---|
| 5,293,087 | A | 3/1994 | Hamano et al. |
| 6,873,703 | B1 | 3/2005 | Enriquez |
| 7,019,617 | B2 | 3/2006 | Pratt et al. |
| 7,106,246 | B1 | 9/2006 | Lindell |
| 7,142,838 | B2 | 11/2006 | Rotzoll |
| 7,199,634 | B2 | 4/2007 | Cho et al. |
| 8,059,628 | B2 | 11/2011 | Bradley et al. |
| 2003/0119568 | A1 | 6/2003 | Menard |
| 2004/0174271 | A1 | 9/2004 | Welles |
| 2004/0259544 | A1 | 12/2004 | Amos |
| 2005/0063348 | A1 | 3/2005 | Donovan |
| 2005/0215274 | A1 | 9/2005 | Matson et al. |
| 2006/0008085 | A1 | 1/2006 | Matsuo |
| 2006/0030373 | A1 | 2/2006 | Park |
| 2006/0100000 | A1 | 5/2006 | Marples et al. |
| 2006/0222118 | A1 | 10/2006 | Murthy et al. |
| 2007/0149257 | A1 | 6/2007 | Cherish et al. |
| 2007/0183449 | A1 | 8/2007 | Beagley et al. |
| 2007/0188305 | A1 | 8/2007 | Drucker |
| 2008/0084836 | A1 | 4/2008 | Baird et al. |
| 2008/0303601 | A1 | 12/2008 | Young |
| 2009/0110035 | A1 | 4/2009 | Sutton et al. |
| 2009/0238308 | A1 | 9/2009 | Weiner et al. |
| 2009/0305628 | A1 | 12/2009 | Vavik |

OTHER PUBLICATIONS

Long, "SiGe Radio Frequency ICs for Low-Power Portable Communication", Proceedings of the IEEE, vol. 93, No. 9, Sep. 2005.
Liapine, A., Resonant Cavities as Beam Position Monitors, Part 3. Analog Signal Processing. Accelerator Physicist, Department of Physics, University of London, UK; 6 pages, web: http://www.hep.ucl.ac.uk/~liapine.
Barry, John R., et al., "Carrier Synchronization for Homodyne and Heterodyne Detection of Optical Quadriphase—Shift Keying," Department of EECS, University of California, Jul. 2, 1992, 36 pages.
Mirabbasi, Shahriar, et al., "Classical and Modern Receiver Architectures," IEEE Communications Magazine, Nov. 2000, 8 pages.
Office action dated Jul. 2, 2013 in JP patent application No. 2011-517638 based on PCT/US2009/050180.
English translation of office action dated Jul. 2, 2013 in JP patent application No. 2011-517638.
Partial English translation of JP 2005-286745.

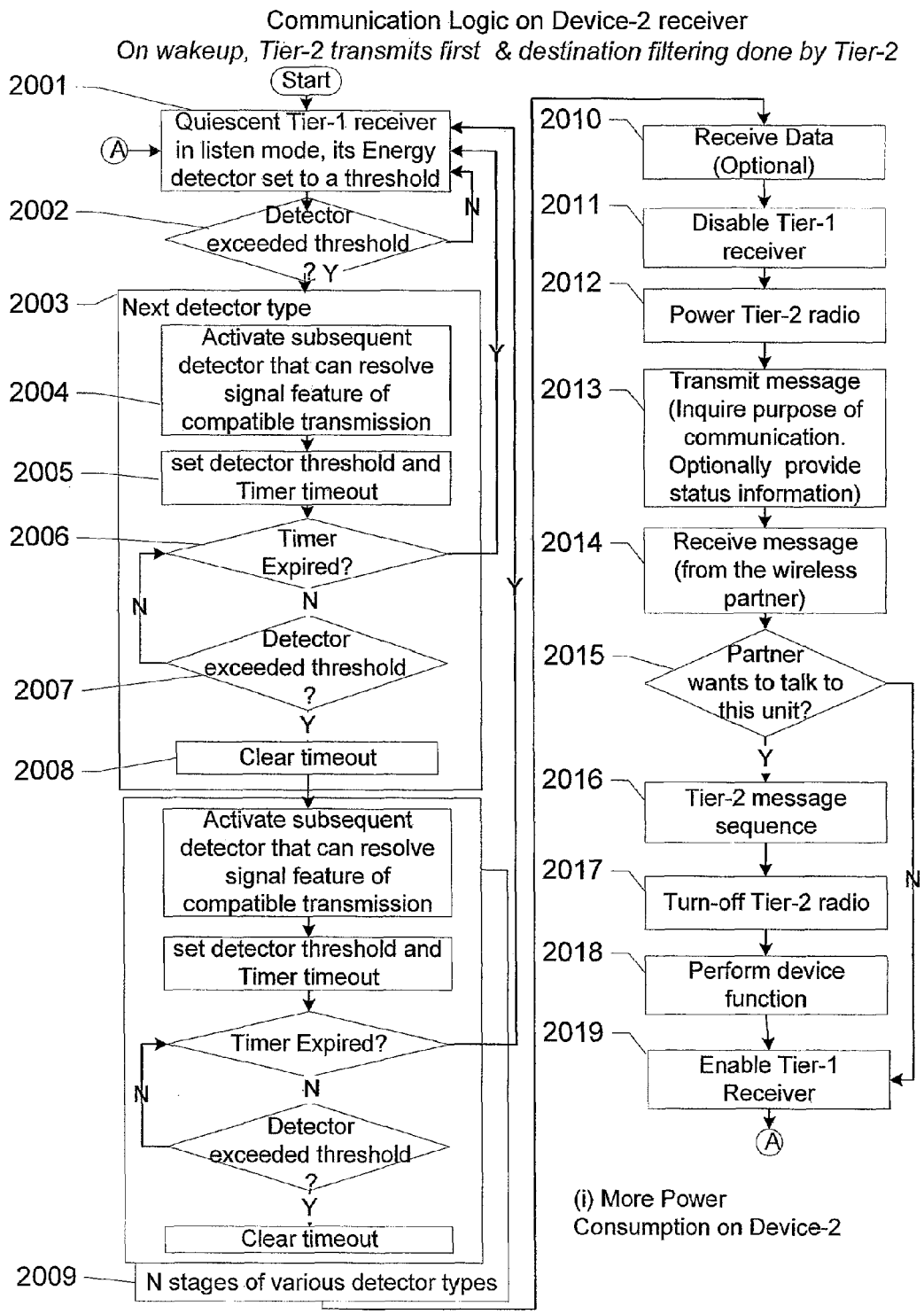
FIG. 20(a.i)

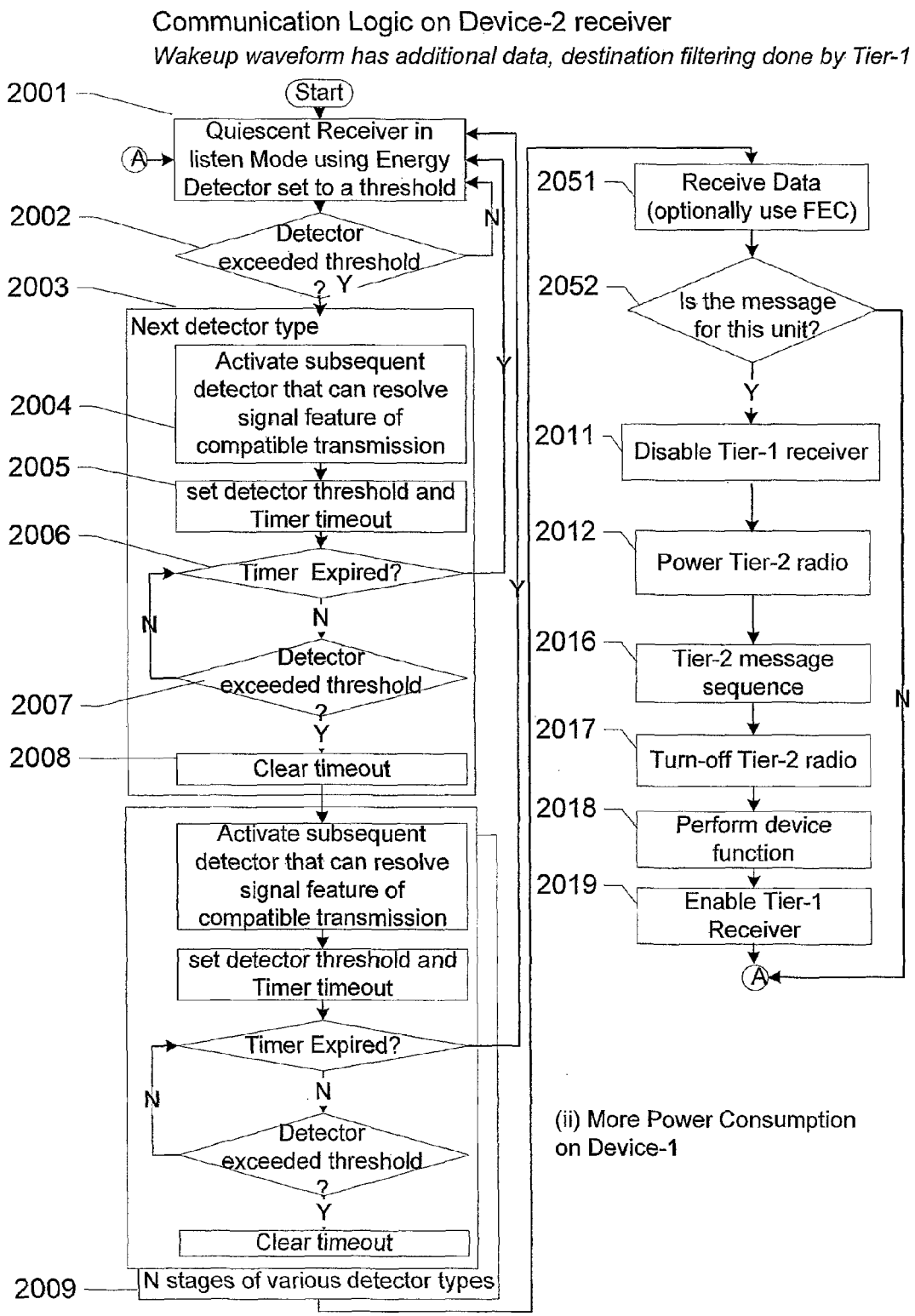
FIG. 20(a.ii)

LOW POWER RADIO COMMUNICATION SYSTEM

CROSS-REFERENCE TO RELATED APPLICATIONS

The present application is a continuation of U.S. patent application Ser. No. 13/747,362, filed on Jan. 22, 2013, incorporated herein by reference, which is a continuation of U.S. patent application Ser. No. 12/500,587, filed on Jul. 9, 2009, entitled "LOW POWER RADIO COMMUNICATION SYSTEM," incorporated herein by reference in its entirety for all purposes, which claims priority of U.S. provisional patent application No. 61/079,435 filed on Jul. 9, 2008, incorporated herein by reference in its entirety, for all purposes.

FIELD OF INVENTION

The present invention generally relates to an improved radio communication system suitable for an apparatus that has an energy budget constraint.

BACKGROUND OF THE INVENTION

Recently, many mobile appliances have been equipped with RF communication capabilities, which provide increased functionalities and opportunities for novel applications. A key problem, however, is the need to often change or charge batteries due to the high energy requirements of RF communication. Short battery life is a major obstacle that precludes the technical viability needed to create new innovative products.

Recent advances in signal processing allow flexible tradeoffs in the design of RF communication circuits, such as throughput, sensitivity, signal-to-noise ratio (SNR), and bit-error rate (BER).

The Shannon-Hartley theorem predicts, for a given information channel capacity, a tradeoff between bandwidth and transmitted power (Wikipedia: Shannon-Hartley Theorem); generally, broader bandwidth use allows lower transmission power, or a higher data rate requires higher transmission power. Normally, a tradeoff between bandwidth efficiency and transmitted power is realized by processing gain using high-speed digital signal logic circuits. While this approach improves efficiency during active communication, the overall power consumption remains high due to the receiver's long operating period. During operation, significant power is expended to listen for asynchronous transmissions. This power and energy load is most pronounced in small mobile devices and is very difficult to reduce due to competing laws of physics. Polling style communication, for example, has been developed to reduce the duty cycle of the continuous link between participating radios. Other approaches, such as active communication and burst-synchronized polling at regular intervals, may be used to reduce average power. (See, e.g., FIG. 1, which shows typical average power consumption as a function of percentage duty cycle in transmitters and heterodyne or non-heterodyne receivers).

In the detailed description below, the term "latency" refers to the delay between the time an information source is ready to send information and the time the information is actually received by a receiver. The term "asynchronous communication" refers to a protocol by which a transmitter device initiates communication with a receiver at any time, without regard to any constraint of local time, or a clock signal, or the state of an intended receiver device. That is, in asynchronous communication the transmitter device initiates transmission at will, independent of the timing at the receiver.

For an appliance that communicates infrequently but demands low latency asynchronous communication, reducing average power consumption by reducing active radio duty-cycle is constrained by the competing latency requirements. This phenomenon is one example of the conflict between functional requirements and battery life.

In the context of the present disclosure, the term 'appliance' refers to an apparatus or a device that performs a specific function or set of functions, and that further includes within its structure a radio communication apparatus, a radio communication system or a radio apparatus, as further described herein. One example of an appliance in this context is a wireless garage door opener.

Heterodyne detection is a method for detecting an electromagnetic signal using a reference frequency. The heterodyne method uses a non-linear frequency mixing effect to beat a locally generated reference signal with the received signal, in the process translating the received signal carrier frequency to a different frequency. The reference signal source is also known in the art as the "local oscillator" (LO). The nonlinear device that combines the received signal and the local oscillator is known as the 'mixer' in the art of radio communication. Heterodyne-based receivers exhibit excellent selectivity and sensitivity.

Reduction of power consumption in a heterodyne receiver is limited by the power that is required to operate the high-frequency LO that, in turn, drives the mixer.

SUMMARY OF THE INVENTION

The present invention provides a method for significantly reducing the average power for radio communication, particularly in applications that require low communication latency. According to one embodiment, the method realizes a low power radio communication system using a non-heterodyne receiver, taking advantage of low power consumption, without making undesirable tradeoffs such as reduced sensitivity.

The present invention uses a non-heterodyne receiver to determine whether a communication partner is attempting to establish communication with it. In the process, the receiver may learn necessary information to establish communication with that partner. The device then powers 'on' a higher performance heterodyne-based radio communication system (albeit one that consumes higher power) to communicate with the partner.

The Shannon-Hartley theorem provides a basis for increasing sensitivity of a non-heterodyne receiver, at the expense of lower data rate (i.e., lower information throughput) at a specified BER. Thus, the non-heterodyne receiver may require more time to correctly identify a distant communication partner. Once the higher performance receiver, or transmitter, or transceiver, is powered 'on' however, data may be exchanged at a higher data rate and lower BER.

The poorer BER of the non-heterodyne receiver may sometime inadvertently result in powering 'on' the higher performance receiver (or transmitter, or transceiver), particularly when the chosen communication protocol requires a response to a signal received by the non-heterodyne receiver. The non-heterodyne receiver may progressively engage higher, more sophisticated modulation techniques and matching demodulators (which may require higher operating power) to increase effective data communication rate or to reduce BER. Thus, the present invention provides a composite waveform with a hierarchy of modulation procedures used by a non-heterodyne receiver, in which higher performance radio communication circuits of successively higher operational power are successively engaged, involving successively lower energy per bit—thus higher data rate communication—as part of the communication protocol. This hierarchy reduces the probability of unintended communication being triggered by communication errors, noise or signal interference. This method can be seamlessly employed to sequentially engage a hierarchy of radio device circuits that otherwise consume excessive power if left on but operationally idle, which may result in unacceptably delayed communication if they are operated at a low duty cycle.

For communication between a stationary device and a mobile device, battery energy load can be traded between the two devices. Thus, in one embodiment, the stationary device may transmit a long composite signal with a long information payload to reduce the probability of false wake up of the mobile device, thus conserving battery energy of the mobile device. In yet another embodiment, the stationary device transmits a short, composite signal with a smaller information payload, thus reducing its own battery drain. In this configuration, the mobile device has a higher probability of false wake up relative to the previous embodiment, thereby resulting in greater battery drain.

According to one embodiment of the present invention, an "Extreme Low Power" (ELP) radio communication system and a method may be realized in a "multi-layered" or "multi-tier" radio communication system. In a multi-layered or multi-tier radio communication system, the present invention provides a hierarchy in which higher performance radio communication systems of successively higher operational power are successively engaged, involving successively high data rate communication as part of the communication protocol.

The present invention is better understood upon consideration of the detailed description below in conjunction with the accompanying drawings.

BRIEF DESCRIPTION OF THE DRAWINGS

FIGS. 20(a.i)-(a.ii) include two flow charts that illustrate the operation of communication logic in an ELP transceiver, one which uses the Tier-2 circuit to perform destination filtering (i.e., determining whether a communication request is directed to it) and the second which uses the Tier-1 circuit to perform destination filtering, respectively, in accordance with the present invention.

To facilitate comparison across figures, like elements in FIGS. 1-24 are provided like reference numerals.

DETAILED DESCRIPTION OF THE INVENTION

The present invention realizes low operating power while maintaining low latency, asynchronous communication. One advantage of the present invention is a radio communication system in which a low power receiver has the requisite sensitivity and communication bandwidth to support asynchronous communication.

Figure 1:
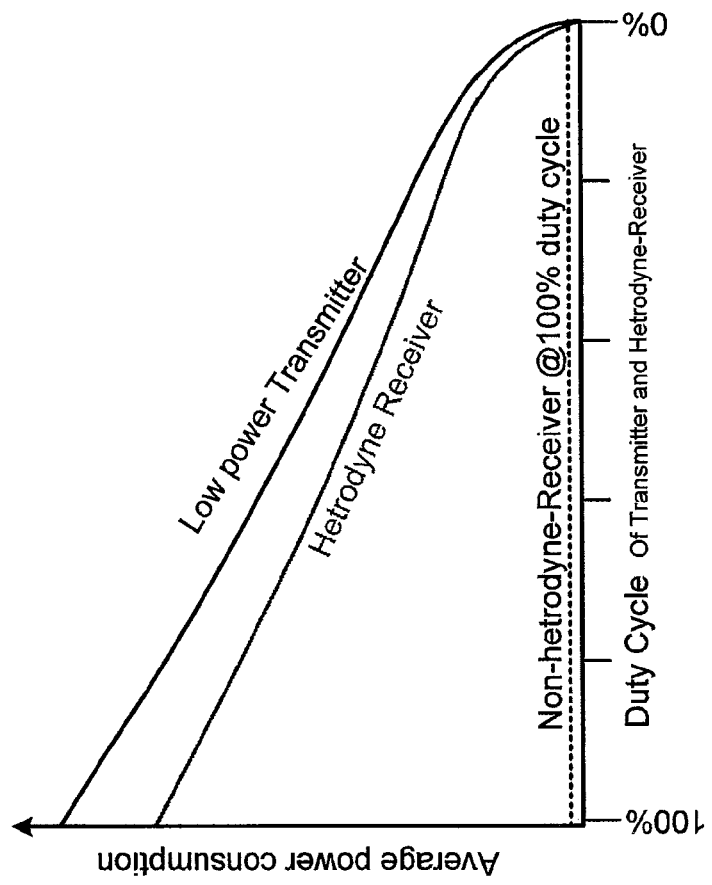
FIG. 1 shows typical average power consumption of a radio communication system as a function of percentage duty cycle in a low power transmitter, a heterodyne receiver, and a non-heterodyne receiver.

As mentioned above, FIG. 1 illustrates average power consumption as a function of duty cycle for a typical low-power transmitter, a "heterodyne" receiver and a "non-heterodyne" receiver. A desirable radio receiver is one that operates at a moderate to modest average power consumption, but which has an acceptable duty cycle so undue delay in the communication process is avoided. A heterodyne receiver's average power consumption cannot be significantly reduced by a duty cycle method without sacrificing latency.

Many conventional low-power analog radio receivers are super-heterodyne based. Such receivers spend much of their power running the local-oscillator (LO) and mixer to down-convert the RF input signal to an intermediate frequency. In these receivers, power consumption increases as the carrier frequency is increased. Use of a phase-locked loop (PLL) to generate the LO further increases the power load. If the receiver also uses a digital detector (e.g. to receive direct sequence spread spectrum {or "DSSS"} modulated signal), high speed-logic for the correlator further increases power consumption.

Figure 2:
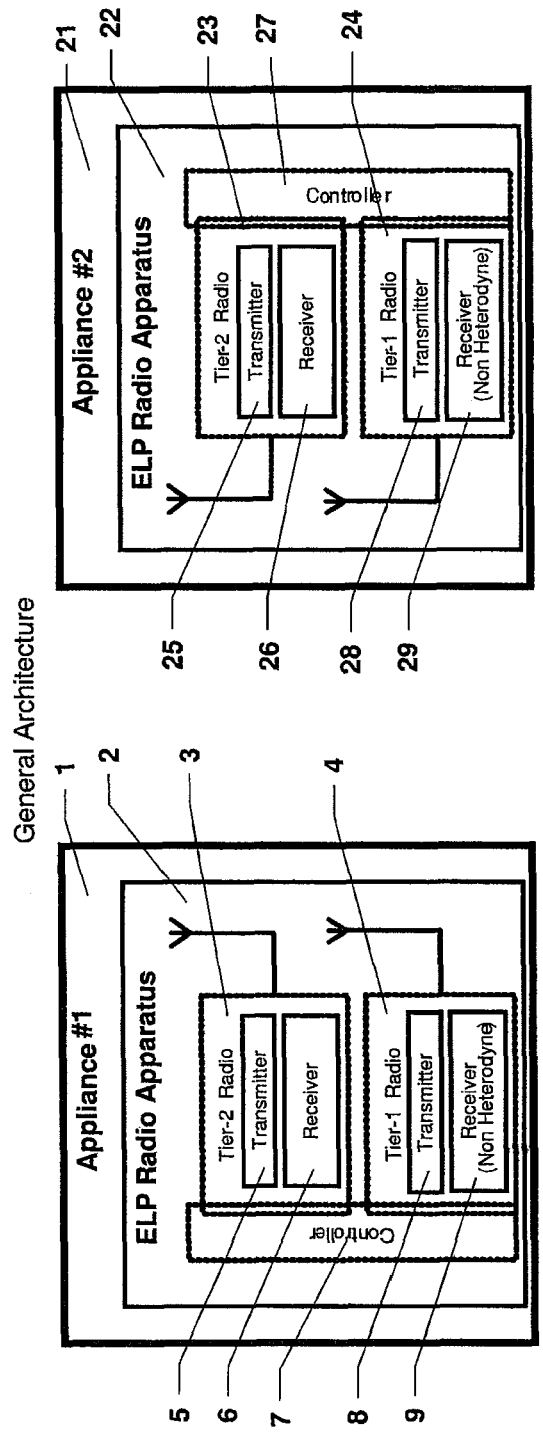
FIG. 2 illustrates an ELP radio communication system, showing appliances 1 and 21 communicating over an electromagnetic communication link with one another

FIG. 2 illustrates an ELP radio communication system, according to one embodiment of the present invention. As shown in FIG. 2, ELP radio apparatuses 2 and 22 communicate over a link with one another. ELP radio apparatuses 2 and 22 each include a Tier-1 circuit (indicated by reference numerals 4 and 24, respectively) which is a full transceiver, where the receiver portion (i.e. receiver 9 or 29) is "non-heterodyne". ELP radio apparatuses 2 and 22 also include Tier-2 circuits 3 and 23. Receivers 6 and 26 in Tier-2 circuits 3 and 23 are of higher performance (in terms of sensitivity, SNR, bandwidth or data rate) and may be implemented by heterodyne receivers. Therefore, Tier-1 receivers 9 and 29 are lower power than receivers 6 and 26.

Figure 3:
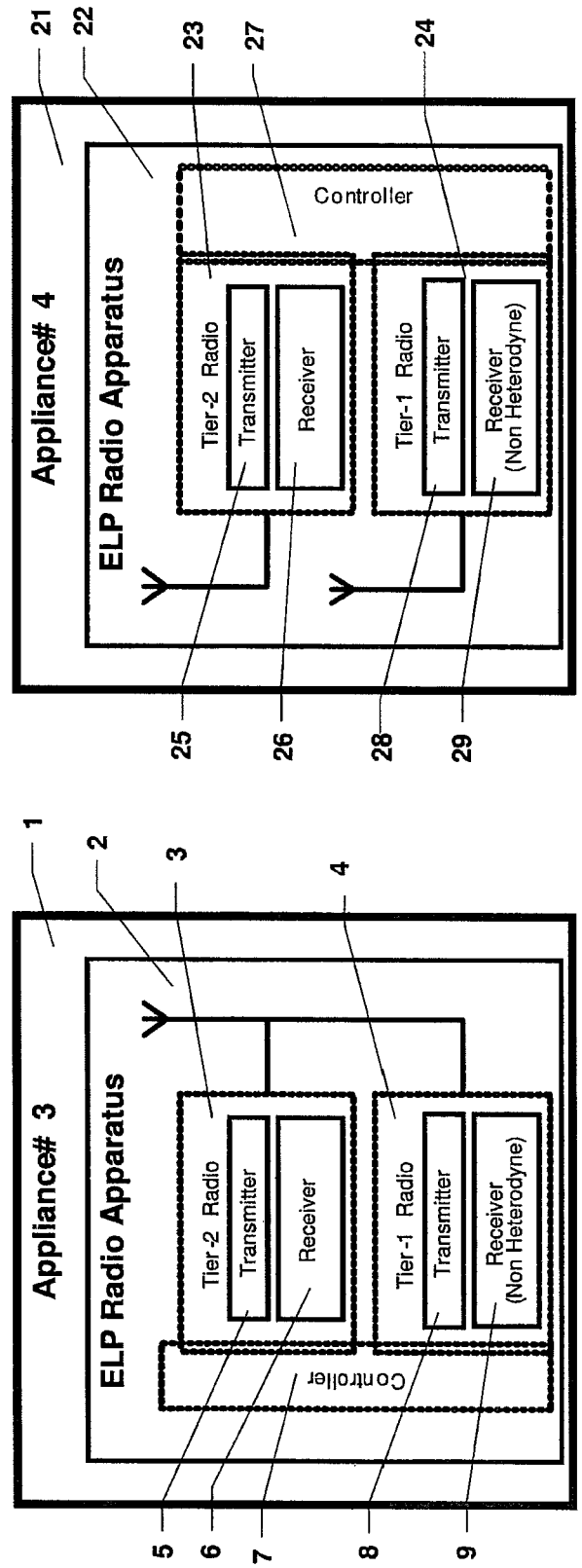
FIG. 3 shows an ELP radio communication system similar to the ELP radio communicating system of FIG. 2, except that Tier-1 circuit 4 and Tier 2 circuit 3 in ELP Radio Apparatus 2, belonging to Appliance #3, share a common antenna, in accordance with one embodiment of the present invention.

FIG. 3 shows an ELP radio communication system similar to the system of FIG. 2, except that Tier-1 and Tier-2 transceivers 3 and 4 share a common antenna, in accordance with one embodiment of the present invention. More generally, in a multi-tier radio of the present invention, the transceivers in an ELP radio apparatus may use a common antenna, separate antennas, or a multiplexed antenna.

Figure 4:
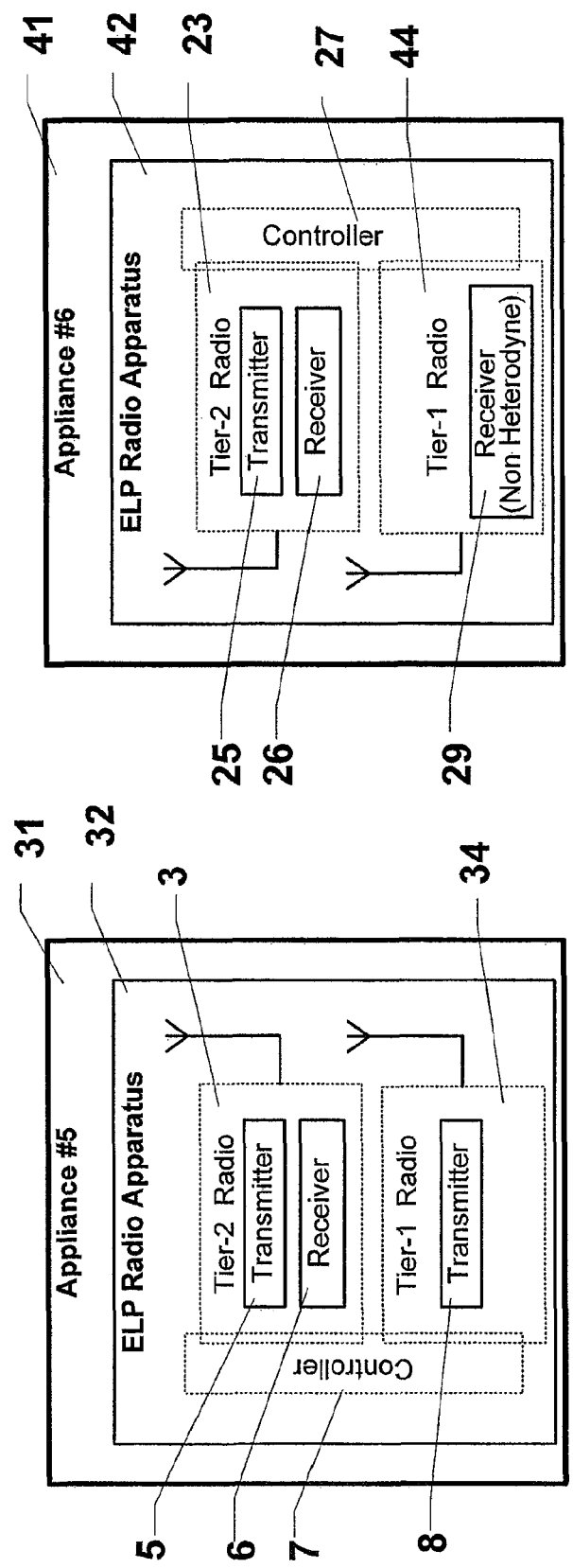
FIG. 4 shows a third ELP radio communication system, in which Tier-1 circuit 34 of ELP radio apparatus 32 in Appliance #5 lacks a non-heterodyne receiver, and Tier-1 circuit 44 of ELP radio apparatus 42 in Appliance #6 lacks a transmitter, in accordance with one embodiment of the present invention.

FIG. 4 shows a third ELP radio communication system, in accordance with one embodiment of the present invention. FIG. 4 shows ELP communicating system including ELP radio apparatuses 32 and 42. Unlike Tier-1 circuit 4 of ELP radio apparatus 2 of FIG. 2, Tier-1 circuit 34 of Appliance #5 does not include a receiver. Tier-1 circuit 44 of Appliance #6 does not include a transmitter.

Figure 5:
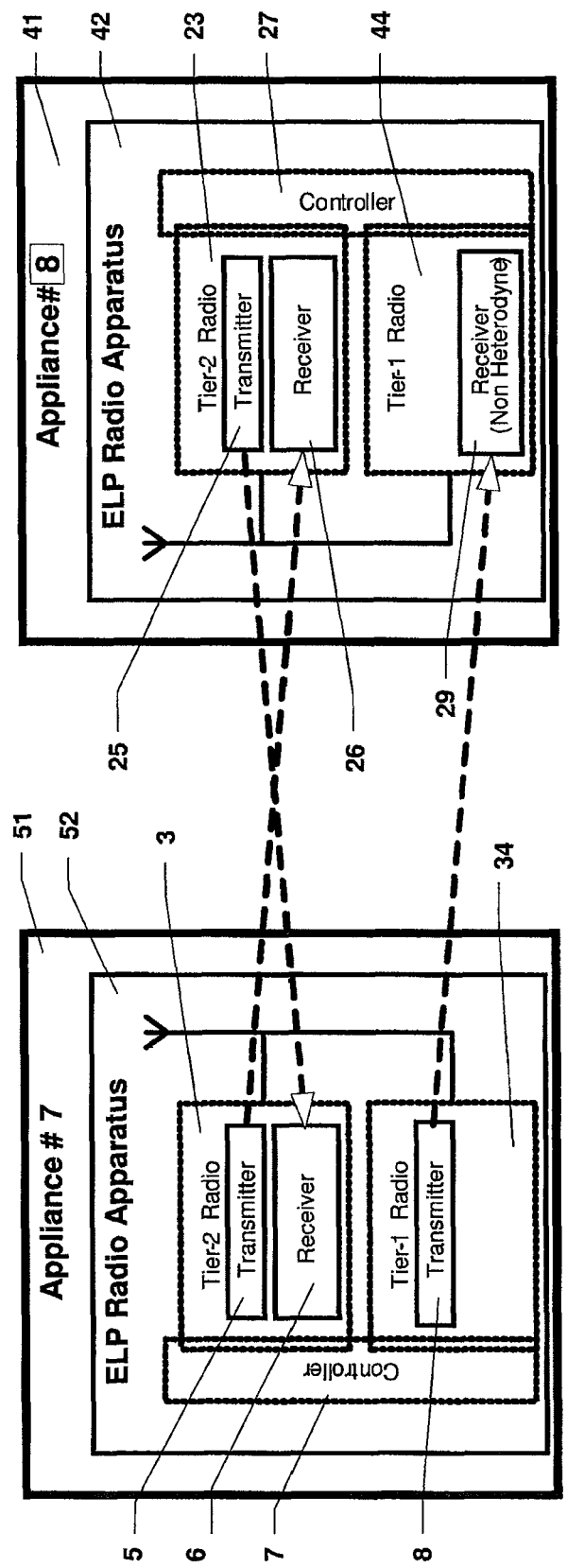
FIG. 5 shows a fourth ELP radio communication system similar to the ELP radio communicating system of FIG. 4, except that Tier-1 circuit 34 and Tier 2 circuit 3 in ELP radio apparatus 52, belonging to Appliance #7, share a common antenna, and Tier-1 circuit 44 and Tier 2 circuit 23 in ELP radio apparatus 42, belonging to Appliance #8, share a common antenna, in accordance with one embodiment of the present invention.

FIG. 5 shows a fourth ELP radio communication system similar to the ELP system of FIG. 4, except that Tier-1 and Tier-2 circuits 34 and 3 of Appliance #7 (element 51) share a common antenna, in accordance with one embodiment of the present invention. Similarly, Tier-1 and Tier-2 circuits 44 and 23 in Appliance #8 (element 41) share a common antenna.

In one embodiment of the invention, the Tier-1 transmitter 8 may use a non-heterodyne method to generate an RF carrier by using an oscillator that includes a negative resistance device (e.g. a tunnel diode, a Gunn diode, a TRAPATT diode or an IMPATT diode).

Figure 6A:
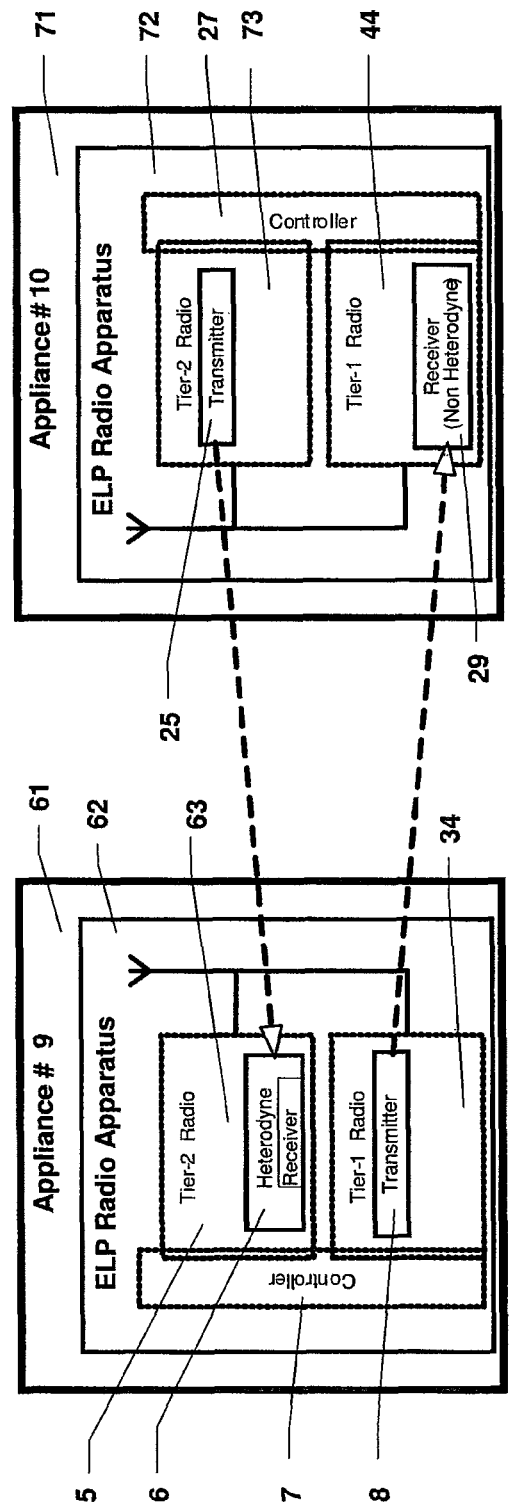
FIG. 6(a) shows a fifth ELP radio communication system similar to the ELP radio communicating system of FIG. 5, except that Tier-2 circuit 63 of ELP radio apparatus 62, belonging to Appliance #9, lacks a transmitter and Tier-2 circuit 73 of ELP radio apparatus 72, belonging to Appliance #10, lacks a receiver, in accordance with one embodiment of the present invention.

FIG. 6(a) shows a fifth ELP radio communication system similar to the ELP system of FIG. 5, except that Tier-2 circuit 63 of ELP radio apparatus 62 of Appliance #9 (element 61) lacks a transmitter, and Tier-2 circuit 73 of ELP Radio Apparatus 72 of Appliance #10 (element 71), lacks a receiver, in accordance with one embodiment of the present invention. Thus, Tier-2 circuit 63 of ELP radio apparatus 62 uses the transmitter 8 of Tier-1 circuit 34. Similarly, Tier-2 circuit 73 of ELP radio apparatus 72 uses the receiver 29 of Tier-1 circuit 44. This asymmetric configuration can be useful in certain compact and low cost applications. Furthermore, each appliance has an asymmetric configuration between Tier-1 and Tier-2 circuits.

Figure 6B:
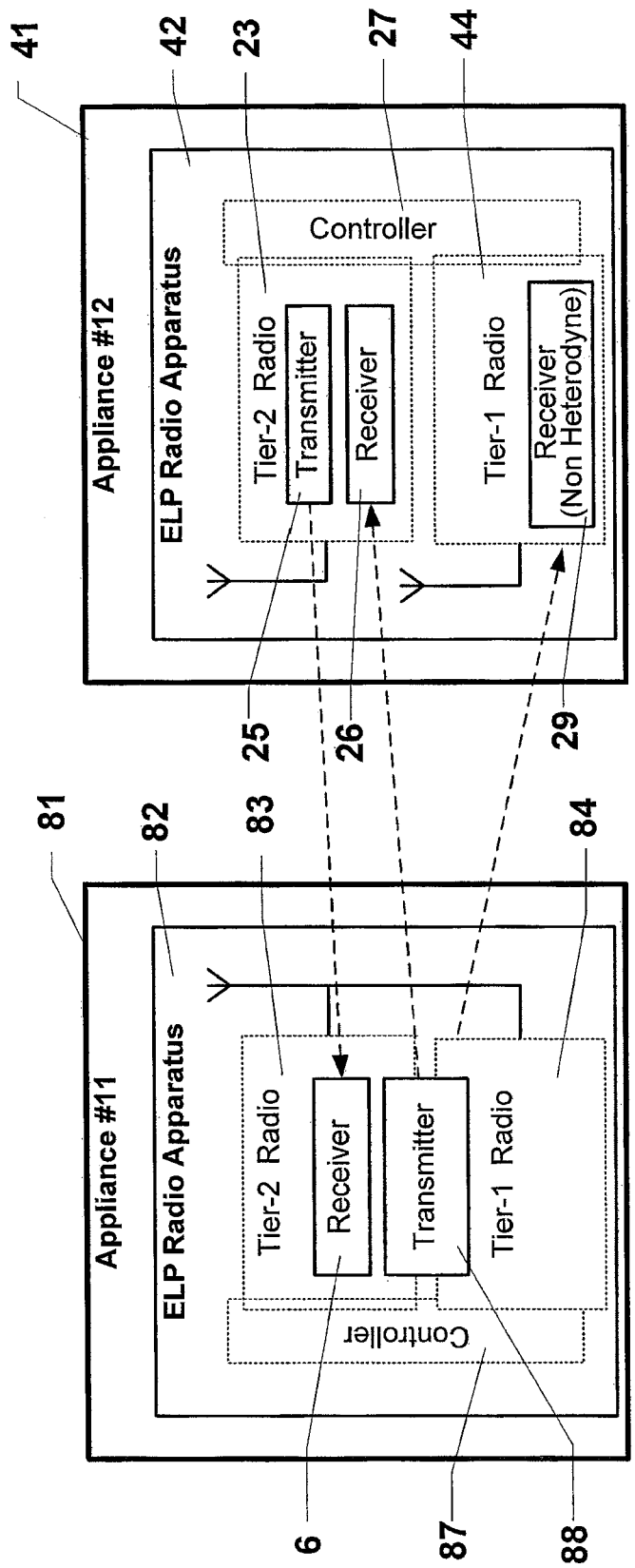
FIG. 6(b) shows a sixth ELP radio communication system similar to the ELP radio communication system depicted in FIG. 5, except that Appliance #11 uses a common transmitter circuit 88 that fulfills transceiver functions of Tier-2 circuit 83, as well as serving as transmitter for Tier-1 circuit 84, in accordance with another embodiment.

FIG. 6(b) shows a sixth ELP radio communication system similar to the ELP system depicted in FIG. 5, except that ELP radio apparatus 82 uses a common transmitter circuit 88 that fulfills the transmitter functions of both Tier-2 circuit 83 and Tier-1 circuit 84, in accordance with another embodiment.

Figure 6C:
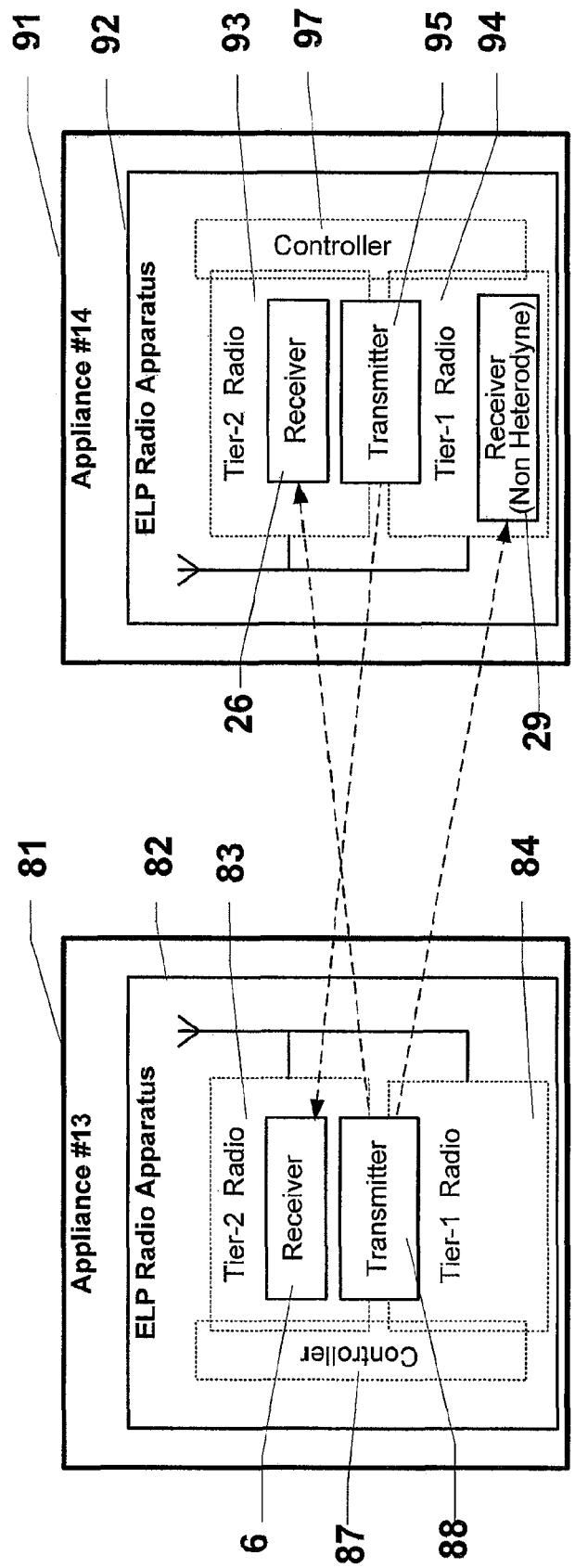
FIG. 6(c) shows a seventh ELP radio communication system similar to the one depicted in FIG. 6(b) except that Appliance #14 (element 91) has Tier-2 circuit 93 and Tier-1 circuit 94 using a common transmitter circuit 95, according to another embodiment.

FIG. 6(c) shows a seventh ELP radio communication system similar to the one depicted in FIG. 6(b) except that Appliance #14 (element 91) has Tier-2 circuit 93 and Tier-1 circuit 94 using a common transmitter circuit 95, according to another embodiment which is useful for routing applications.

Figure 6D:
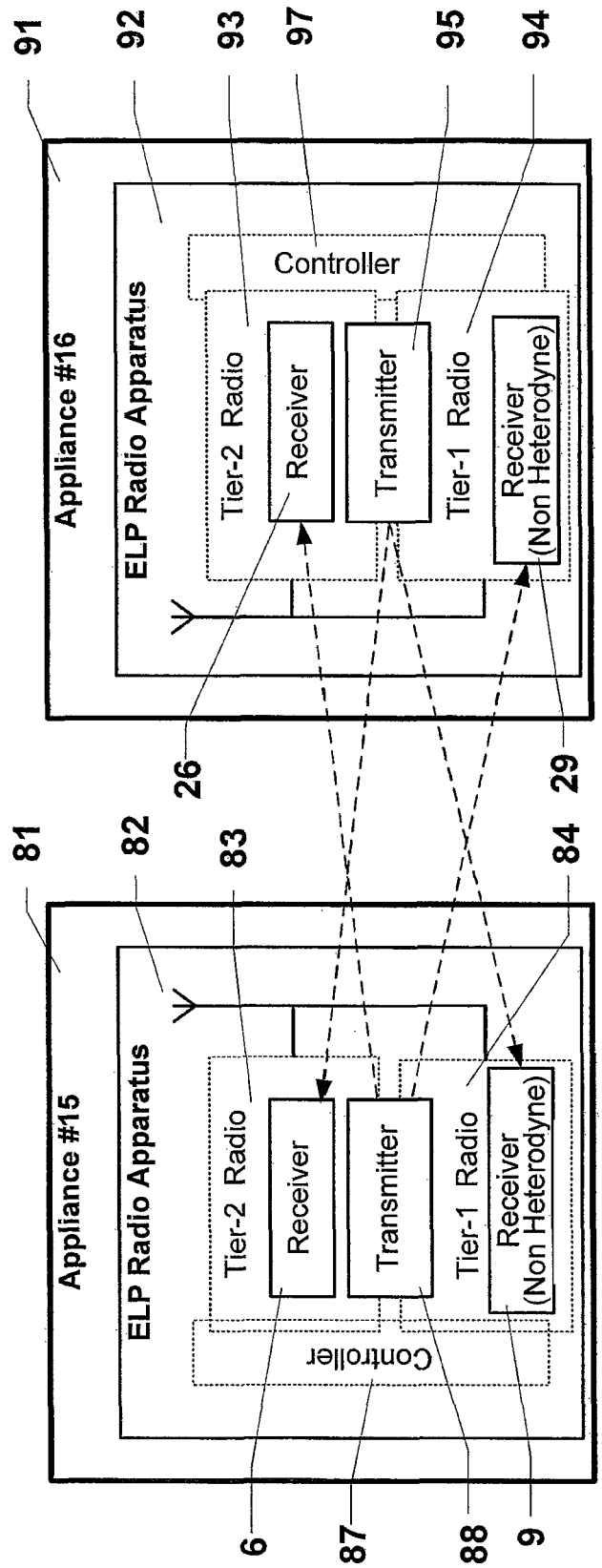
FIG. 6(d) shows an eighth ELP radio communication system similar to the one depicted in FIG. 3 except that
 a. Tier-1 circuit 94 and Tier-2 circuit 93 in ELP radio apparatus 92, belonging to Appliance #16, share a common antenna.
 b. Appliance #15 uses a common transmitter circuit 88 that fulfills transceiver functions of Tier-2 circuit 83, as well as serving as transmitter for Tier-1 circuit 84. Appliance #16 (element 91) has Tier-2 circuit 93 and Tier-1 circuit 94 using a common transmitter circuit 95, according to another embodiment.

FIG. 6(d) shows a preferred embodiment of an ELP radio communication system similar to the one depicted in FIG. 3 except that Tier-1 circuit 84 and Tier-2 circuit 83 in ELP radio apparatus 82 of Appliance #15, share a common antenna, and Tier-1 circuit 94 and Tier-2 circuit 93 in ELP radio apparatus 92 of Appliance #16 also share a common antenna. Further, Tier-1 circuit 84 and Tier-2 circuit 83 in ELP radio apparatus 82 of Appliance #15 (element 81) share a common transmitter 88. Likewise, Tier-1 circuit 94 and Tier-2 circuit 93 in ELP radio apparatus 92 of Appliance #16 (element 91) share a common transmitter 95. This configuration is therefore symmetric and useful in large mesh style networks, for example.

In each of the embodiments of FIGS. 2-6, with a modest communication bandwidth in a Tier-1 circuit, the non-heterodyne receiver reliably detects a request for asynchronous communication from a radio partner. The request may provide additional information necessary to efficiently set up subsequent communication conducted using Tier-2 (or higher) radio circuits, which are of higher performance than Tier-1 circuits as determined by one or more of the following parameters: data rate, sensitivity, signal-to-noise ratio, bit-error-rate, spectral-efficiency and energy per bit.

Figure 7:
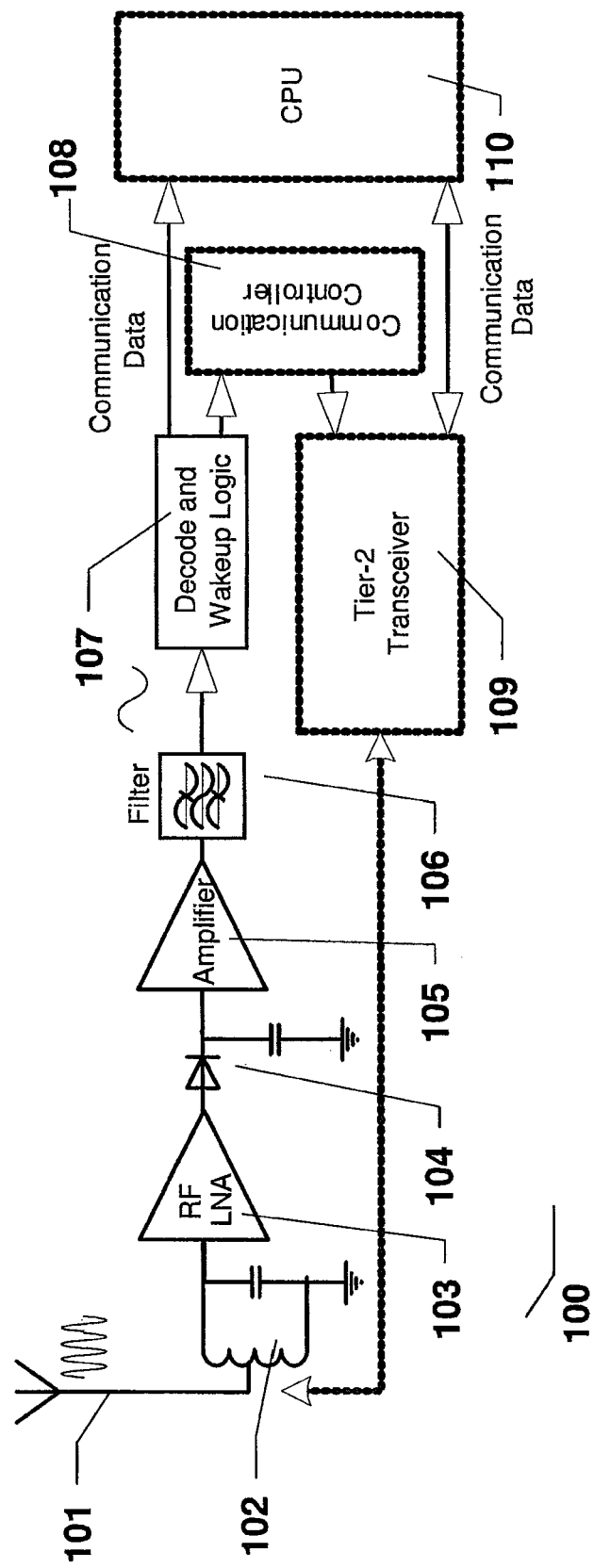
FIG. 7 shows an ELP radio communication system in which a low power non-heterodyne receiver 100 is used in a Tier-1 circuit of an ELP radio communication system.

FIG. 7 shows an ELP radio apparatus in which a low-power, non-heterodyne receiver 100 is used in a Tier-1 circuit. As shown in FIG. 7, a radio signal is received by the non-heterodyne receiver through antenna 101 and tuned by channel-tuning element 102 including, for example, discrete or distributed tuning elements. The tuned signal is amplified by low-noise, RF amplifier 103 (optional) and demodulated by diode-detector based, RF-demodulator 104. Such detector can be selected from a diode detector, such as a Schottky diode, a tunnel diode, a back diode, or a metal-insulator-metal (MIM) diode, and a transistor. The demodulated signal is then amplified in 105 and filtered by 106 to reduce noise/interference (optional). The demodulated and filtered signal is a base band signal that is decoded in decoder 107 to recover the encoded information and determine if it is a valid wakeup signal from a partner radio apparatus.

In one embodiment of the ELP transceiver shown in FIG. 7, RF amplifier 103 may comprise a tunnel diode, a Gunn diode, a TRAPATT diode, or an IMPATT diode, operating along the negative slope region of the diode's current-voltage characteristics to perform as an RF amplifier. This embodiment provides higher receiver sensitivity, superior signal-to-noise ratio while consuming low power and a more compact layout.

Further, because a tunnel diode has a very sharp nonlinear region, a tunnel diode may also be used as a detector in the ELP transceiver of FIG. 7, such as crystal detector 104. Variants of tunnel diodes (e.g. back-diode and MIM {metal-insulator-metal} diode) can similarly be used as detectors.

In one embodiment of the ELP transceiver shown in FIG. 7, RF amplifier 103 may comprise a regenerative circuit (i.e. using positive feedback) amplifier.

In FIG. 7, communication controller 108 and Tier-2 transceiver 109 are drawn in dotted lines to indicate that, while they are elements of the ELP radio system, they are not elements of the heterodyne receiver 100. Central processing unit (CPU) 110, is a computing element that provides overall control, but is not part of the ELP radio system either.

In one embodiment of an ELP radio communication system, within the energy budget, the CPU (or preferably an MCU {Microcomputer Unit}) under program control may provide part of the functionality of 'Communication Controller' 108 or even 'Decode and Wakeup Logic' 107.

With an efficient data modulation scheme (e.g., amplitude shift keying {ASK} using an efficient analog-to-digital converter{ADC}), more bits can be transmitted per symbol period, with or without the use of error correction techniques. The shorter Tier-1 broadcast can reduce transmitter battery load.

According to the embodiment of the present invention shown in FIG. 7 in which CPU 110 is provided in the radio communication system, CPU 110 may be implemented by a custom integrated circuit or in one or more programmable logic circuits. Suitable programmable logic circuits may include, for example, field-programmable gate arrays (FPGAs) or complex programmable logical devices (CPLDs). In a custom integrated circuit implementation, CPU 110 may be provided as an application specific integrated circuit (ASIC). Other embodiments may include a microcomputer unit (MCU) with an ADC circuit.

Figure 13:
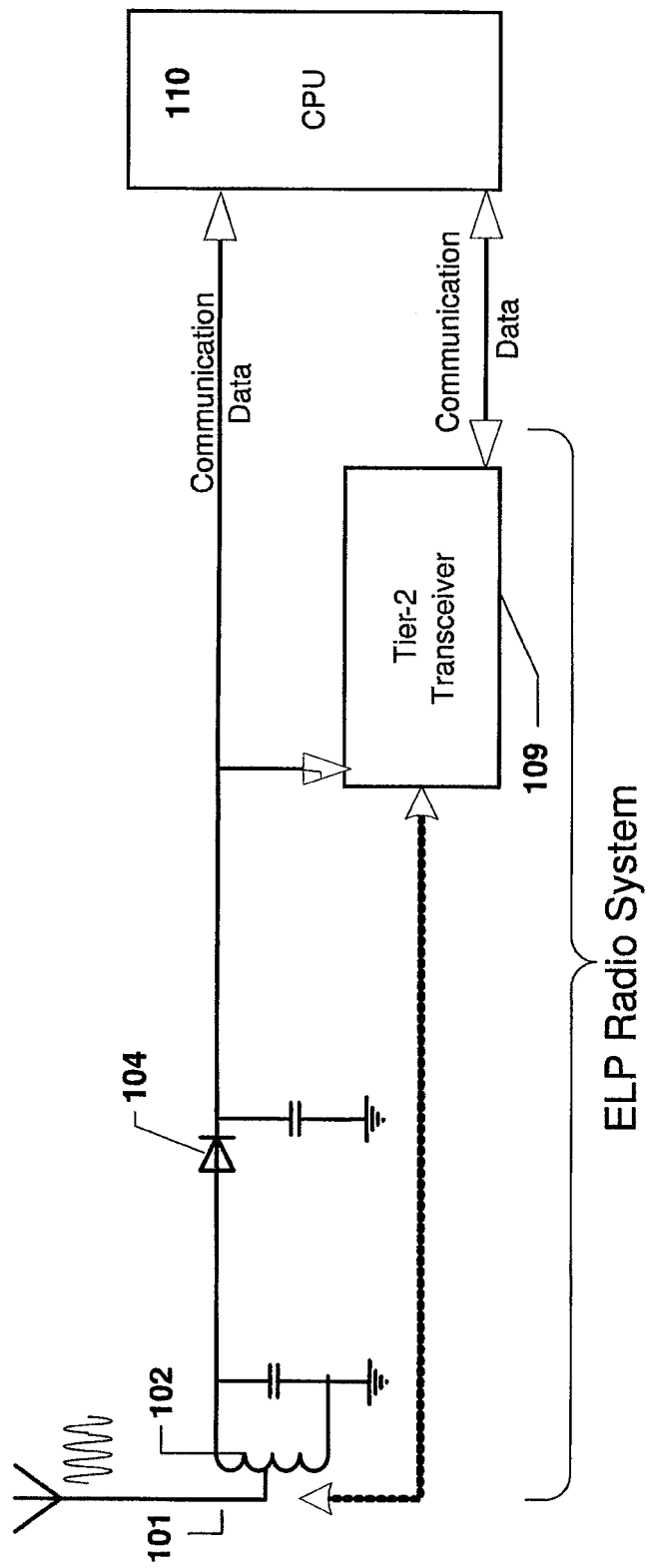
FIG. 13 shows an ELP radio suitable for use in a very simple environment.

In one embodiment, a sufficiently strong output signal detected by RF demodulator 104 may be used as a binary signal representing a request sent by a communication partner to initiate asynchronous communication. FIG. 13 shows an ELP radio suitable for use in a very simple environment. Upon detecting the signal, Tier-2 (or higher) transceiver 109 may be activated to communicate with the partner. Activation includes taking Tier-2 transceiver 109 from a power-saving state (e.g., a "deep-sleep" or "hibernate" state) to a power 'on' or normal operational state.

In one embodiment of the present invention, non-heterodyne radio receiver 100 is always operating. In another embodiment of the present invention, non-heterodyne radio receiver 100 is turned 'on' (i.e. placed in an active state from an inactive state) for a short period of time regularly, based on a predetermined schedule. This active period can be either a fixed period of time, or a fixed period of time where the time base is synchronized with a local environment time (cf. FIGS. 21(a)-(b)), or a predetermined pseudo-randomly assigned duration. For example, the operation of the non-heterodyne radio receiver can be selected to be between 0.1% and 50% duty cycle.

The sensitivity of non-heterodyne receiver 100 may vary according to the environment in which the ELP transceiver is used. Normally, sensitivity is a design parameter and one of several ranges of sensitivity can be used. For example, in one embodiment of the present invention, the receiver sensitivity can be better than −40 dBm. In another embodiment, more restrictive conditions may impose a higher sensitivity on the receiver (e.g., better than −60 dBm).

Figure 8A:
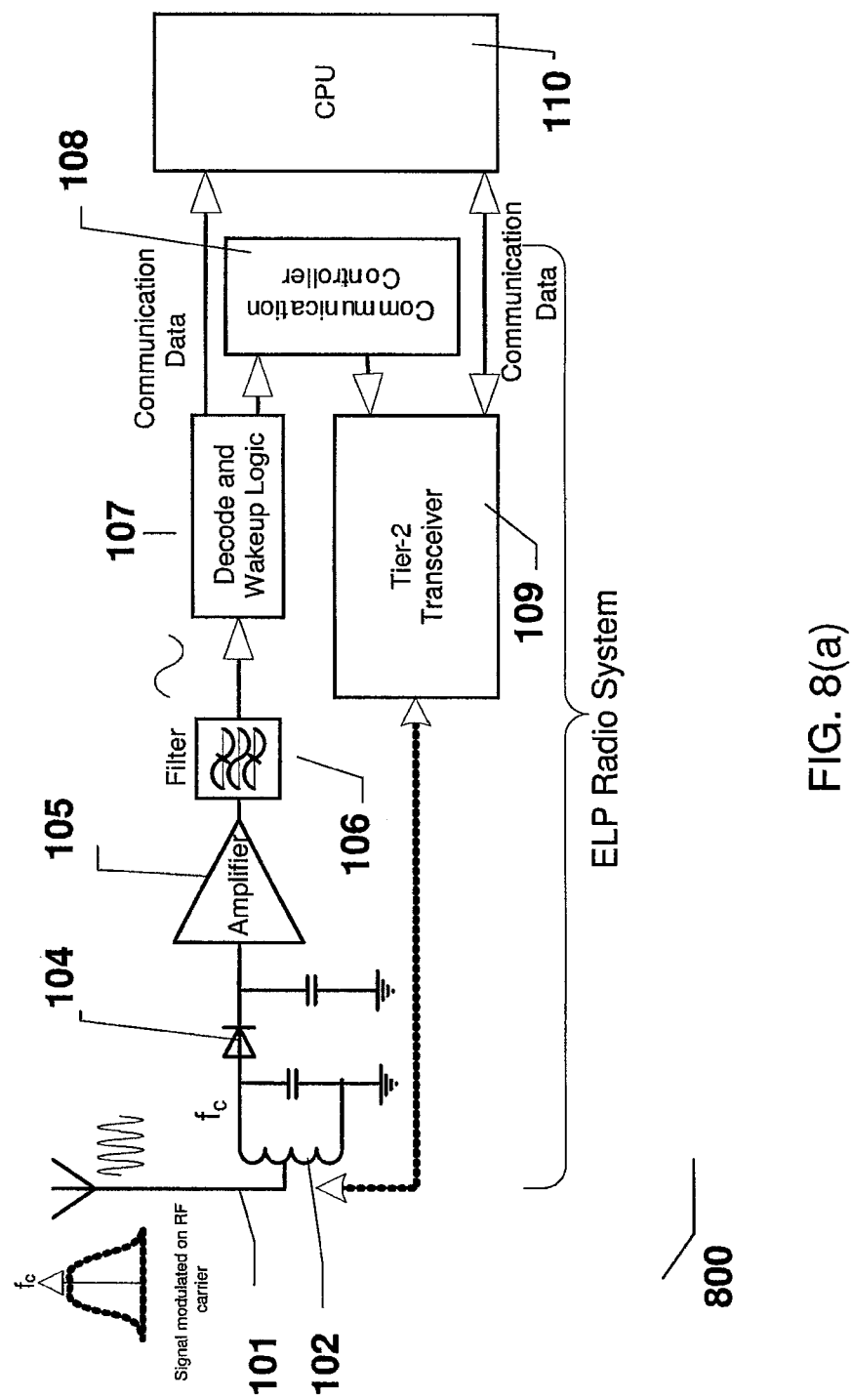
FIG. 8(a) shows a low power non-heterodyne receiver 800 in one embodiment of an ELP radio system for receiving a signal that is modulated directly on the RF carrier frequency ($f_c$).
Figure 8B:
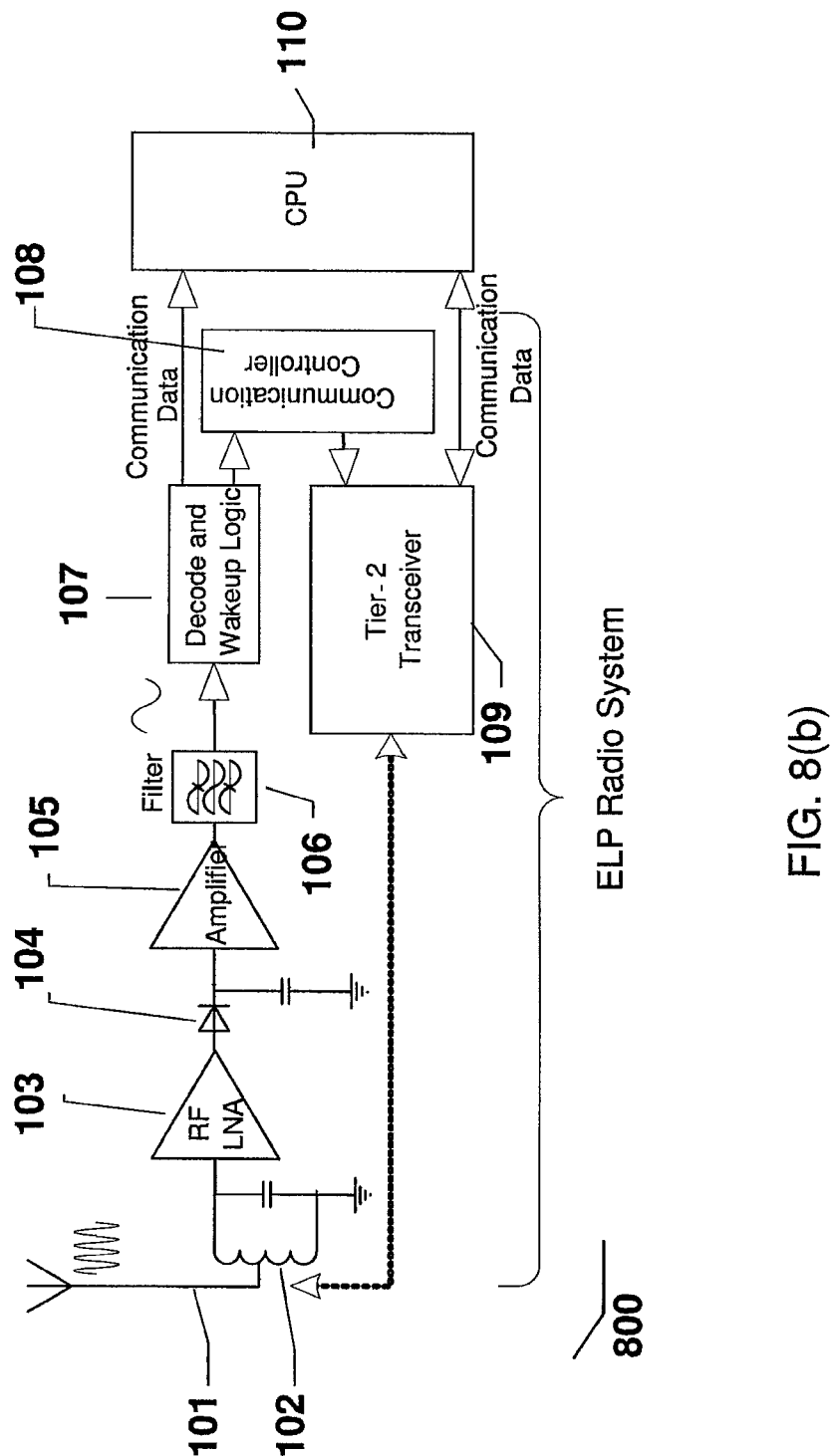
FIG. 8(b) is a variation of the ELP radio system of FIG. 8(a), with inclusion of low noise RF amplifier 103.
Figure 14A:
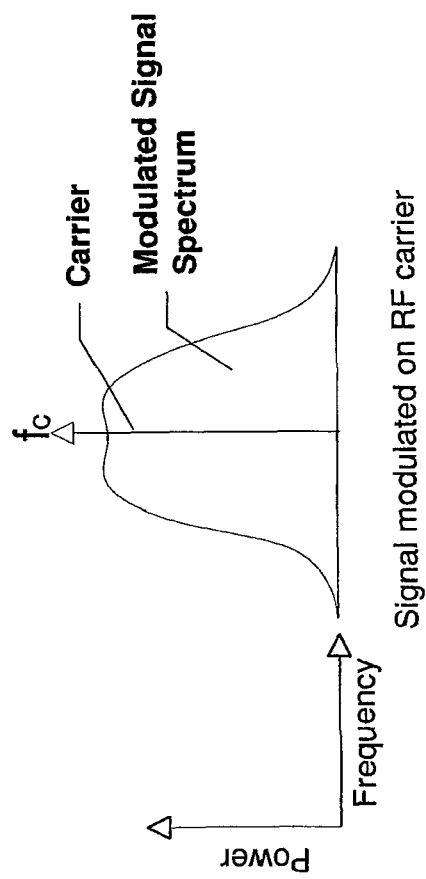
FIG. 14(a) shows the spectrum of a signal that is modulated directly on the RF frequency carrier.

The radio signal may be modulated directly on the radio frequency carrier ($f_c$). FIG. 8(a) shows low power non-heterodyne receiver 800 in one embodiment of an ELP radio system for receiving a signal that is modulated directly on the RF frequency carrier ($f_c$). The spectrum of a signal that is modulated directly on the RF frequency carrier is shown in FIG. 14(a). As compared to non-heterodyne receiver 100, non-heterodyne receiver 800 lacks RF amplifier 103. Detector 104 recovers the base-band signal. As the radio signal is directly modulated on the carrier signal, the request for communication may be detected at this point. For greater sensitivity, the recovered signal is amplified by 105 before decoding at 107. The result of signal detection decides whether or not to use Tier-2 transceiver 109. Receiver 100 (which includes low power RF amplifier 103) provides higher granularity. Each tier of the multi-tier circuit may use the same or different carrier frequency and frequency spectra. FIG. 8(b) is a variation of the ELP radio system of FIG. 8(a), with inclusion of low noise RF amplifier 103 resulting in higher receiver sensitivity.

Figure 9:
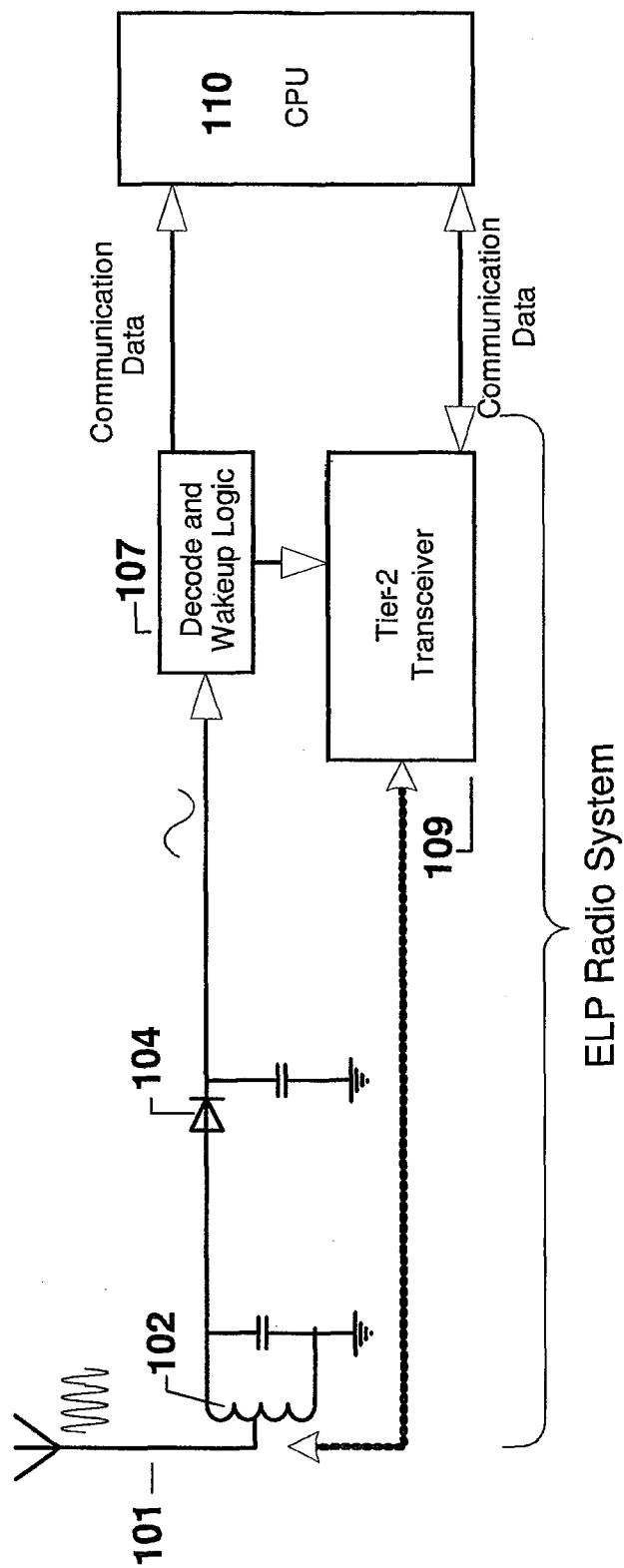
FIG. 9 shows an ELP radio system, including an amplitude modulated (AM) receiver circuit, for use in an environment with strong RF field strength and weak noise or interference sources, according to one embodiment of the present invention.

FIG. 9 shows an ELP radio system including an amplitude-modulated (AM) receiver circuit for an environment with a strong RF field and weak noise or interference sources, according to one embodiment of the present invention. In FIG. 9, low noise amplifier 103, amplifier 105 and filter 106 need not be provided. Fewer parts and a simpler scheme allow this low cost system to respond to an asynchronous communication request and to activate a high-performance, power efficient, Tier-2 transceiver.

Figure 10:
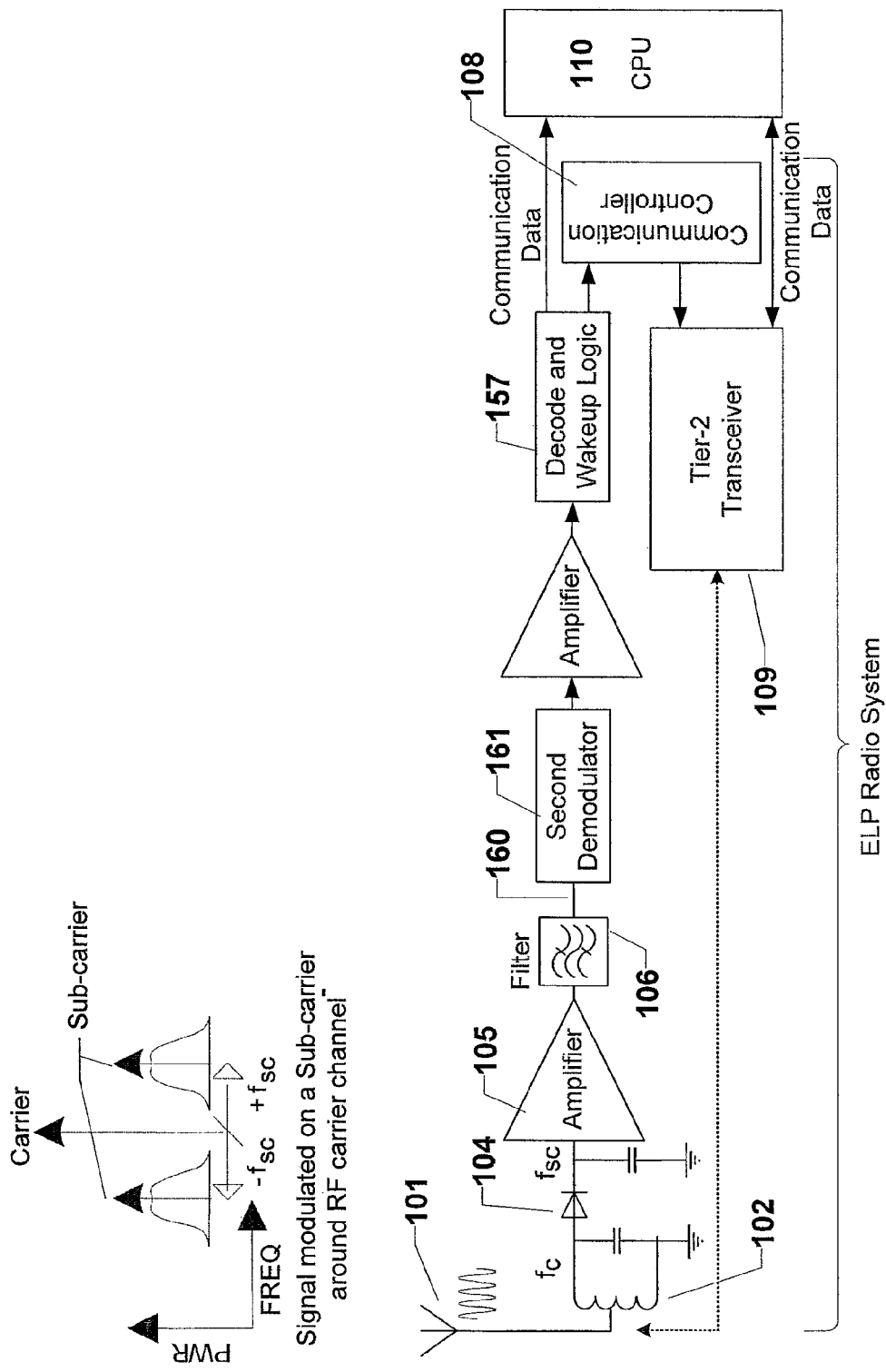
FIG. 10 illustrates an ELP radio system for use with a signal which is modulated on a sub-carrier, in accordance with one embodiment of the present invention.
Figure 14B:
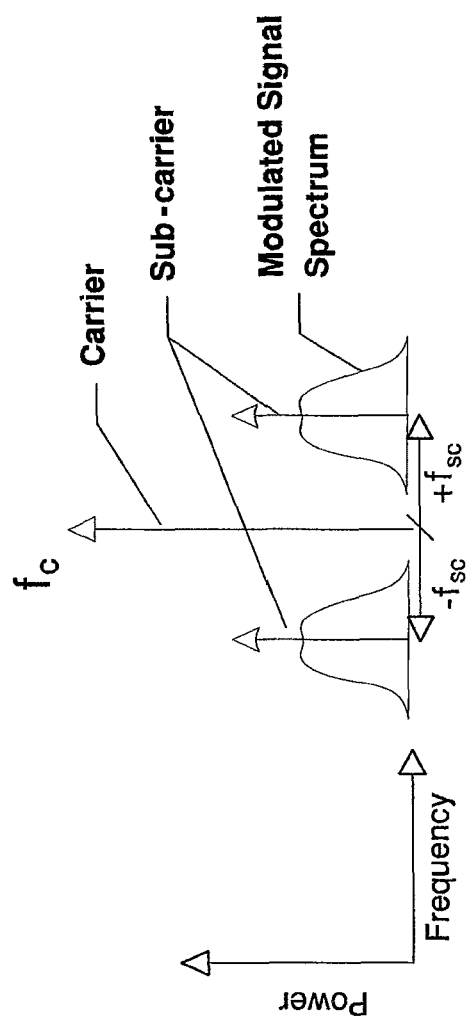
FIG. 14(b) shows the spectrum of a signal that is modulated on a sub-carrier.

In many cases, because of amplifier noise considerations, the signal is first modulated on a sub-carrier frequency ($f_{sc}$), which is then further modulated on the carrier signal. The spectrum of a signal that is modulated on a sub-carrier is shown in FIG. 14(b). FIG. 10 illustrates an ELP radio system for use with a signal that is modulated on a sub-carrier, in accordance with one embodiment of the present invention. As shown in FIG. 10, in the manner already discussed with respect to FIG. 8(a) above, the carrier signal is detected, amplified and filtered by detector 104, amplifier 105 and filter 106, respectively. Recovered signal 160, which is modulated on the subcarrier ($f_{sc}$), is demodulated by 161. Second demodulator 161 may be, for example, a frequency discriminator. Second demodulator 161 may also be any of the demodulators discussed above, except that demodulation is performed on a subcarrier signal.

Amplifier 105 can be a conventional amplifier or a regenerative circuit that uses positive feedback.

Modulating the request information on a subcarrier frequency provides a level of robustness over modulation on the carrier directly, yet the modulation scheme is reasonably simple and overcomes 1/f type noise. Such noise immunity is particularly important under low current operations of the amplifier. The subcarrier may be demodulated using a heterodyne receiver without incurring a large power penalty. This is because the local oscillator for a sub-carrier ($f_{sc}$) is a much lower frequency than the RF carrier ($f_c$) and, therefore, does not impose a high power penalty that is typical of the RF carrier frequency. Further, the heterodyne based sub-carrier demodulator may be powered only when the input signal power is sufficiently strong.

Figure 11:
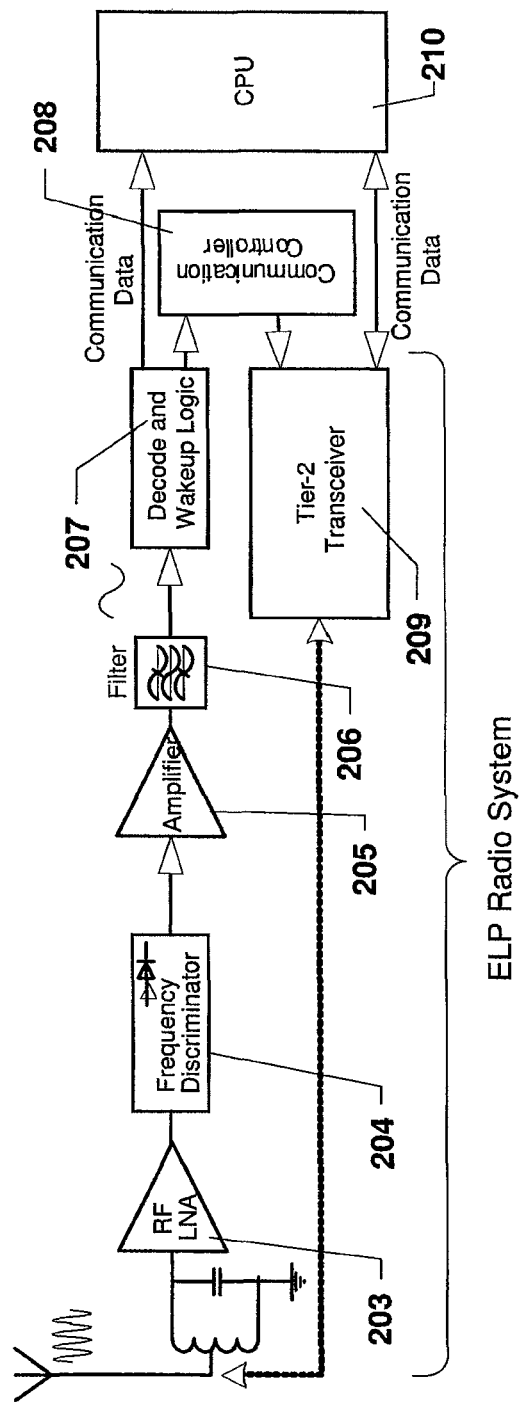
FIG. 11 shows an ELP radio system for use with a signal which is FM modulated on RF carrier ($f_c$), according to one embodiment of the present invention.
Figure 12:
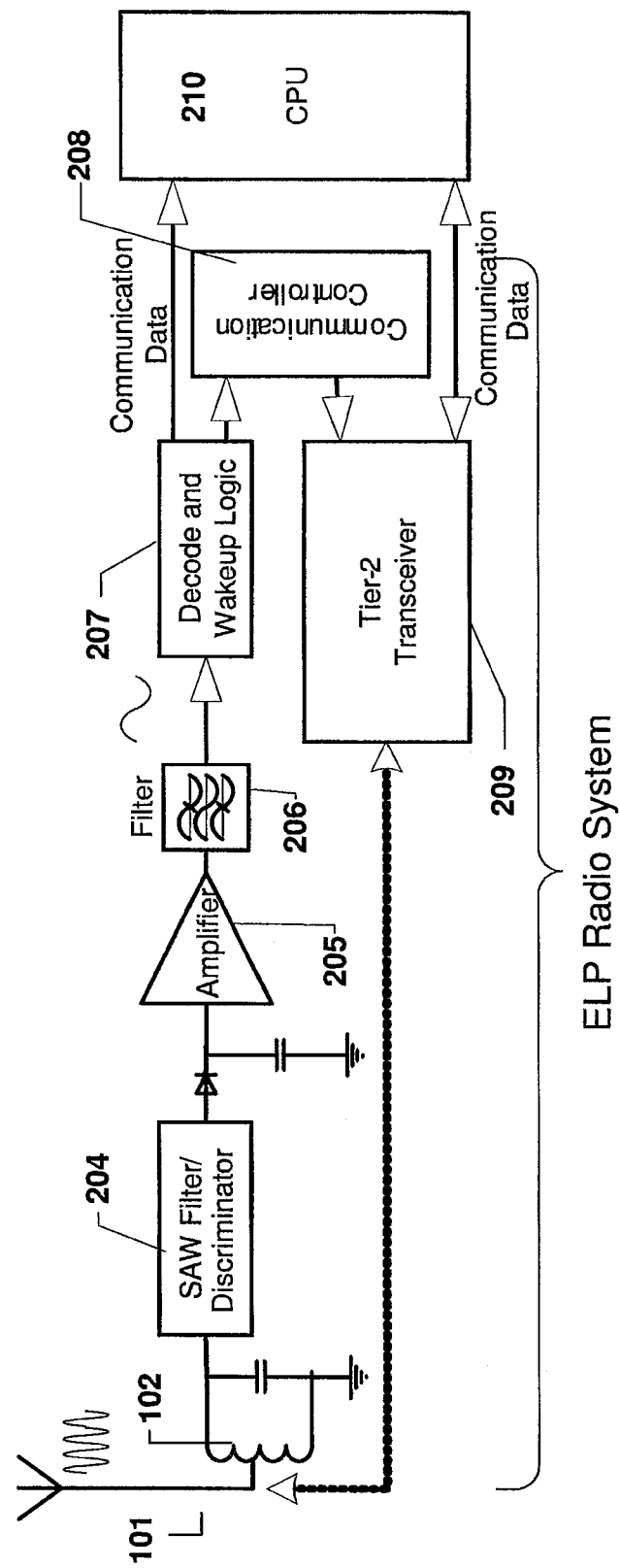
FIG. 12 shows an ELP radio system that demodulates an FM modulated, RF carrier ($f_c$) using a bulk material frequency discriminator, according to one embodiment of the present invention.

According to the present invention, a low power radio receiver may demodulate a frequency-modulated (FM) RF carrier without using heterodyne principles. FIG. 11 shows an ELP radio system that demodulates an FM modulated RF carrier ($f_c$), according to one embodiment of the present invention. As shown in FIG. 11, the signal is demodulated by a frequency discriminator or a filter with sharp edge 204. Frequency discriminator 204 may be realized by discrete components or a bulk material filter (e.g., a surface acoustic wave (SAW) filter or piezo-electric crystals). FIG. 12 shows an ELP radio system that demodulates $f_c$ using a bulk material frequency discriminator, according to one embodiment of the present invention.

In an environment where a high level of noise or interference is present, a non-heterodyne receiver circuit discussed above may generate false wakeup events, leading to energy-wasteful, unnecessary activation of Tier-2 (or higher) radio circuits. Such false wake-up events may be avoided by suitably modulating information using any of many modulation schemes that are compatible with the first demodulator. Suitable modulation schemes include, but are not limited to:

a. AM modulation using one or more frequencies—requires a receiver including an amplifier, narrow band filter and detector;

b. slow FM modulation of a carrier that is AM modulated—e.g., the receiver detects the FM modulation and decodes the embedded digital data modulated on the carrier;

c. digital data encoding using ASK—under this technique, digital data are encoded as amplitude variations in the carrier signal; (e.g., a four-level encoding scheme represents two bits per symbol interval and an eight-level scheme represents three bits per symbol interval);

d. digital data encoding using On-Off keying (OOK)—under this common form of ASK, presence of a carrier signal encodes a binary '1', and absence of the carrier signal (or diminished amplitude) encodes a binary '0' ("presence or absence of tone"). To conserve power, the digital data may be decoded using low speed logic circuits or the central processing unit (e.g., CPU 110) operating in a reduced speed mode;

e. digital data encoding using Frequency-Shift Keying (FSK)—a technique similar to ASK, except that the digital data are encoded as discrete changes in the frequency of a carrier signal;

f. Pulse-Width Modulation (PWM)—a square wave with its pulse-width modulated in time; can be detected according to the variations in the average value of the waveform;

g. Pulse-Position Modulation (PPM)—under this scheme, a group of M bits is encoded in a single transmitted pulse that is shifted in time by one of the corresponding $2^M$ possible time-shifts;

h. Pulse-Code Modulation (PCM)—under this scheme, binary bits of code words are used to modulate a carrier or sub-carrier signal (e.g., using an OOK modulation);

i. Pulse-Amplitude Modulation (PAM)—under this scheme, the message information is encoded in the amplitude of a series of signal pulses;

j. PN encoding—typically, in a "direct sequence" encoding scheme, bits of a pseudorandom-noise (PN) sequence modulate a carrier or subcarrier (e.g., in an OOK manner).

In addition, robustness can be enhanced using error-correction techniques on the transmitted data, such as: i) parity or error correcting code (ECC) coded data; ii) forward error correction (FEC) coded data.

Figure 15A:
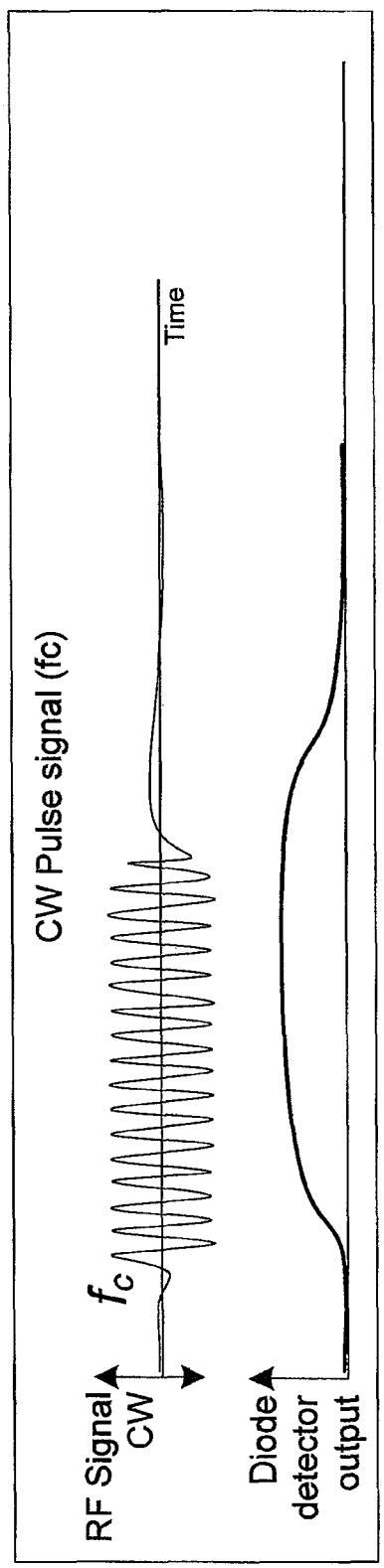
FIG. 15(a) illustrates an envelope-modulated RF carrier modulation scheme including continuous wave (CW) modulation.
Figure 15B:
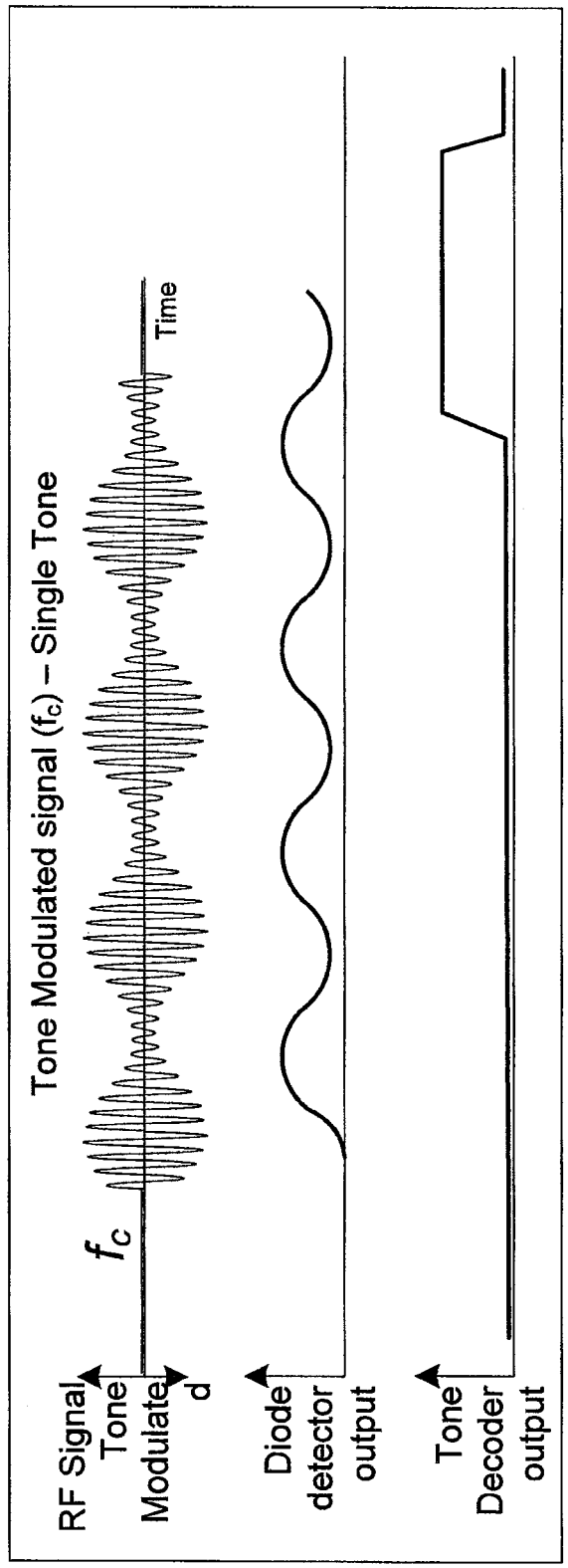
FIG. 15(b) illustrates an envelope-modulated RF carrier modulation scheme including frequency or tone modulation.
Figure 15C:
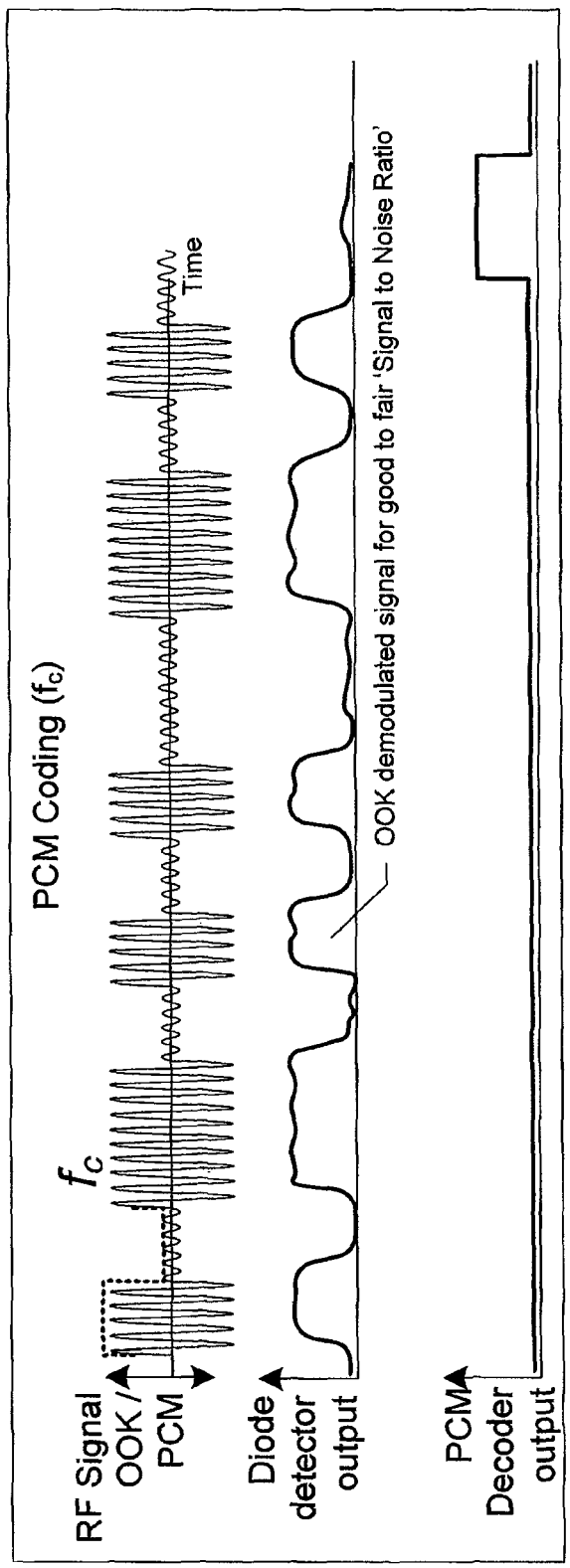
FIG. 15(c) illustrates an envelope-modulated RF carrier modulation scheme including PCM coding using OOK modulation.
Figure 15D:
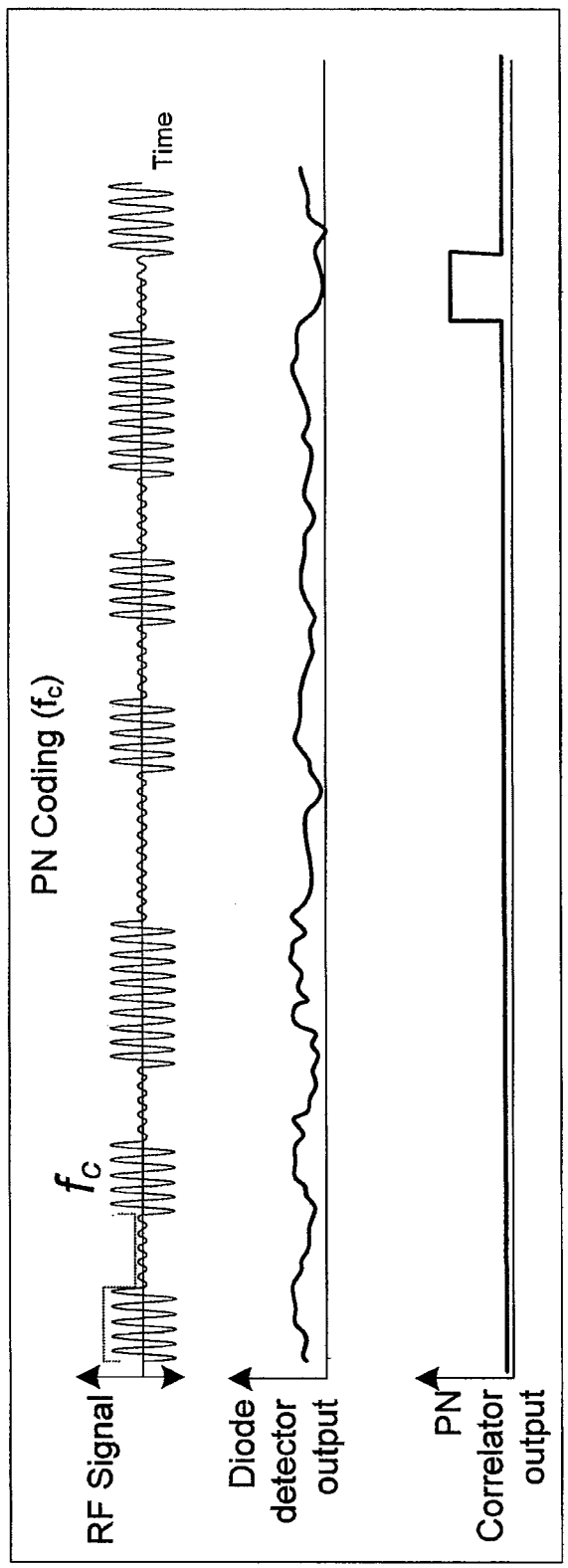
FIG. 15(d) illustrates an envelope-modulated RF carrier modulation scheme including direct sequence PN coding using OOK modulation.

FIGS. 15(a) through (e) illustrate a number of envelope-modulated RF carrier modulation schemes, including: FIG. 15(a) continuous wave (CW), FIG. 15(b) frequency or tone modulation, FIG. 15(c) PCM coding using OOK, FIG. 15(d) direct sequence PN coding using OOK, and FIG. 15(e) a composite scheme involving CW and OOK schemes. In FIGS. 15(a) through (e), the modulated waveforms and the output waveform at the diode detector (e.g., diode detector 104 of FIG. 7) are shown. In FIGS. 15(b)-(d), where information is modulated onto the carrier envelope, the output waveforms of the digital decoder (e.g., decoder 107 of FIG. 7) are also shown.

Figure 15E:
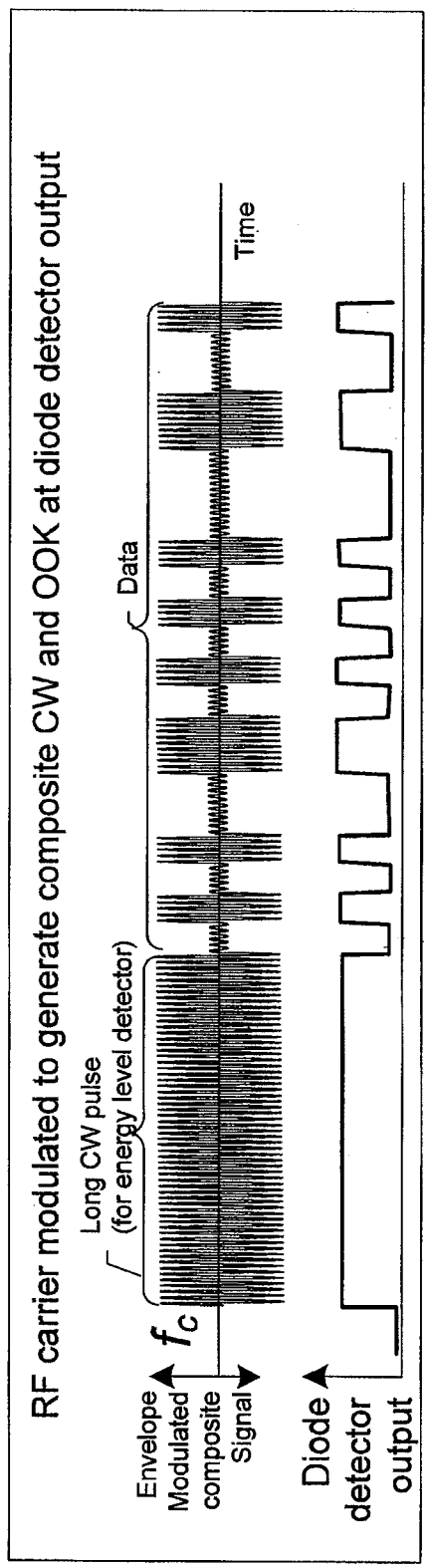
FIG. 15(e) illustrates an envelope-modulated RF carrier modulation scheme including a composite modulation scheme involving CW and OOK schemes.

Notice that in digital data modulation schemes, such as pulse-code modulation (PCM), amplitude-shift keying (ASK), and on-off shift keying (OOK), shown in FIGS. 15(c) through (e), the signal comprises a string of symbols stretched in time. In the case of OOK modulation, the symbols correspond to either '0' or '1'. However, one of the conveniences of using an ASK modulation scheme is that more than one bit of information can be sent in each symbol period, although it does require a linear receiver and good SNR.

Figure 16A:
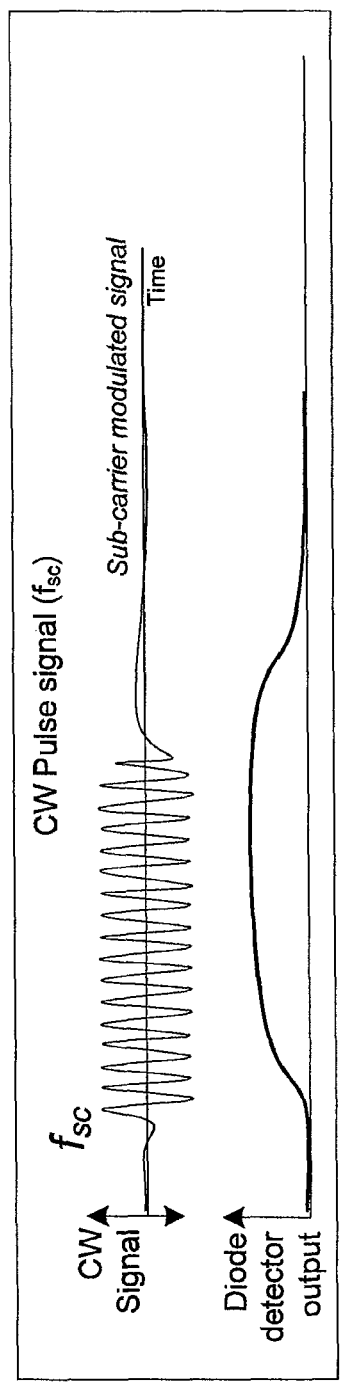
FIG. 16(a) illustrates an envelope-modulated signal with sub-carrier modulation including continuous wave (CW) modulation.
Figure 16B:
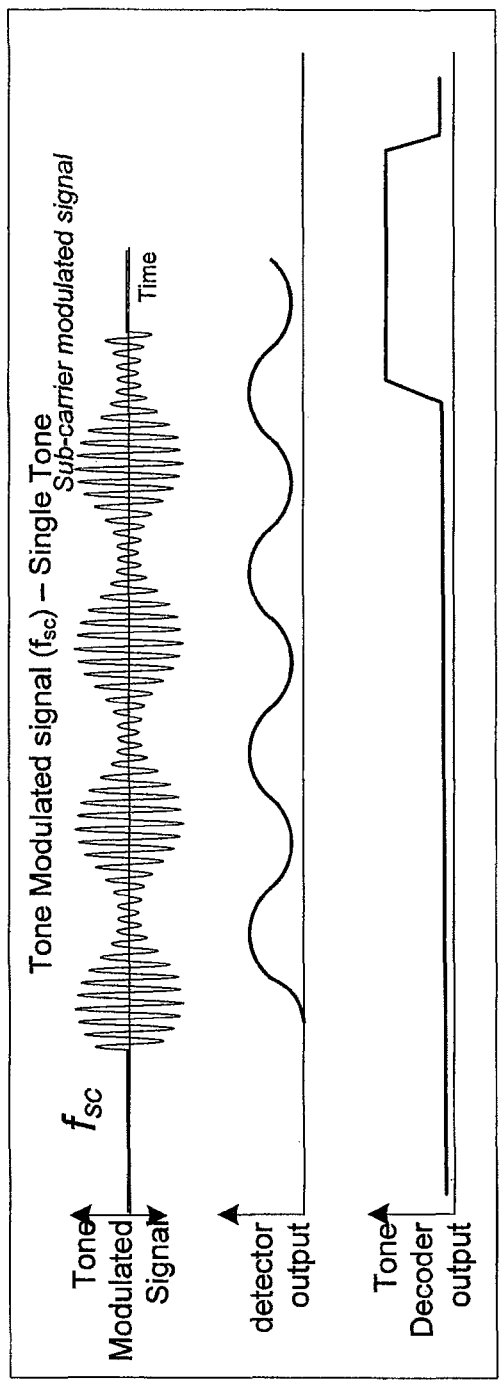
FIG. 16(b) illustrates an envelope-modulated signal with sub-carrier modulation including frequency or tone modulation.
Figure 16C:
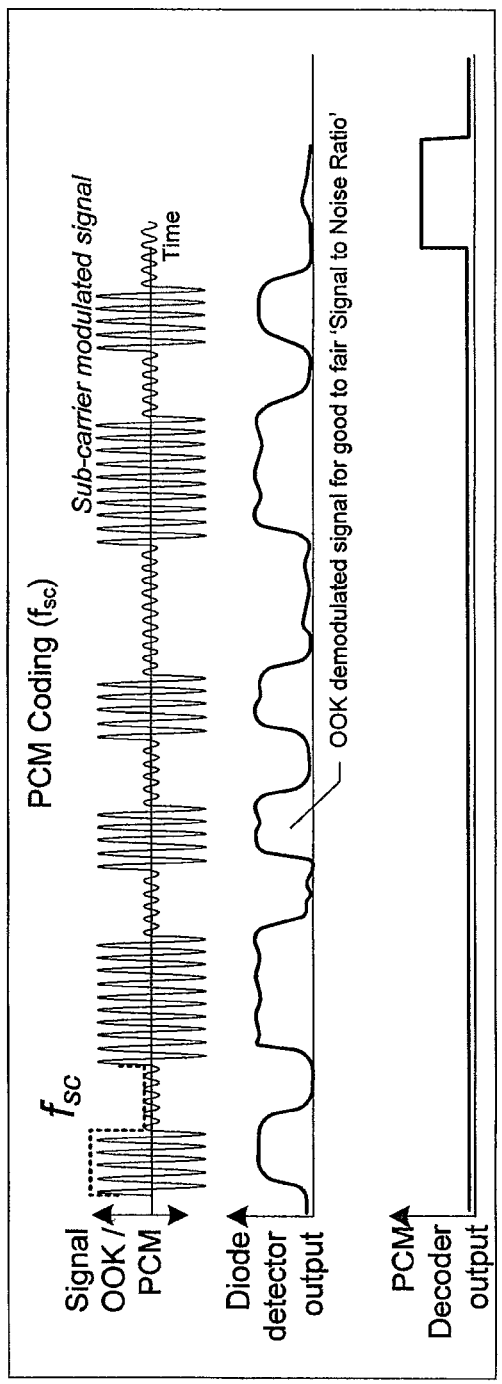
FIG. 16(c) illustrates an envelope-modulated signal with sub-carrier modulation including PCM coding using OOK modulation.
Figure 16D:
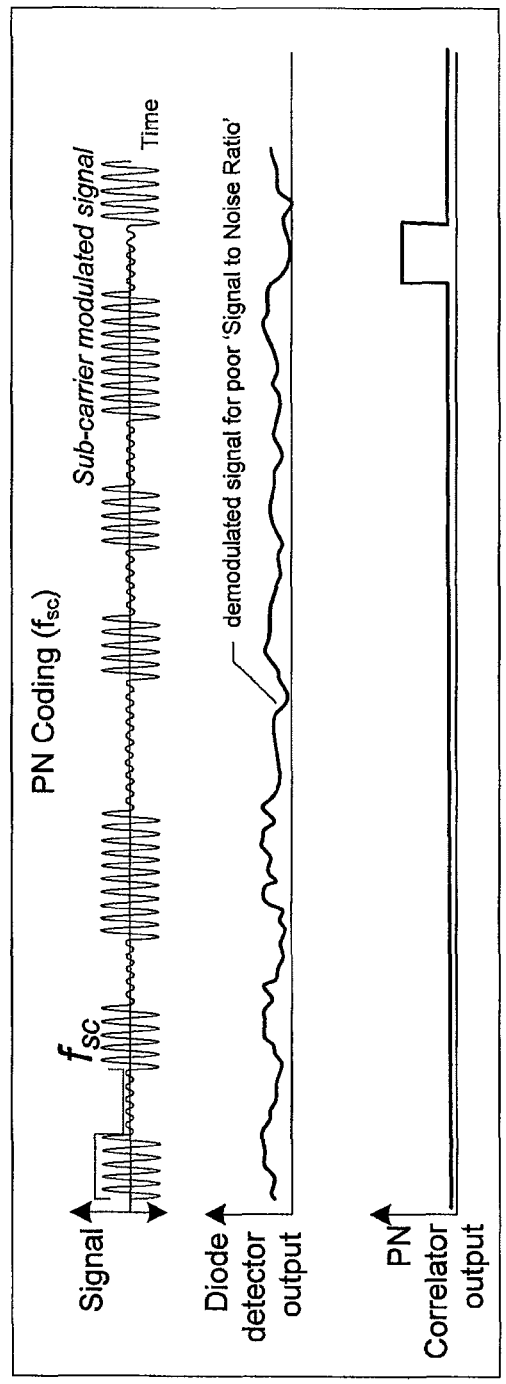
FIG. 16(d) illustrates an envelope-modulated signal with sub-carrier modulation including direct sequence PN coding using OOK modulation.
Figure 16E:
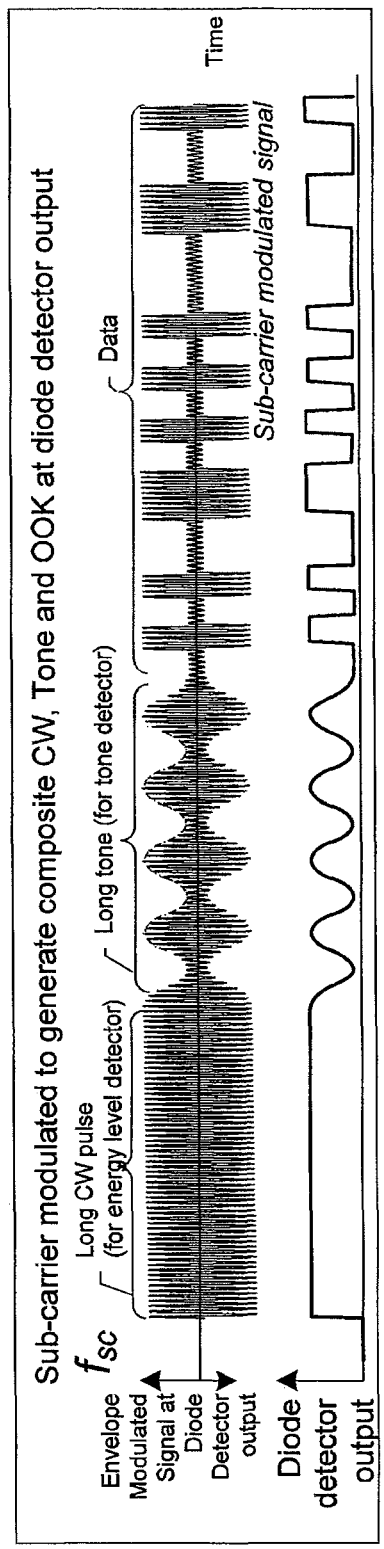
FIG. 16(e) illustrates an envelope-modulated signal with sub-carrier modulation including a composite modulation scheme involving CW, tone and OOK schemes.
Figure 16F:
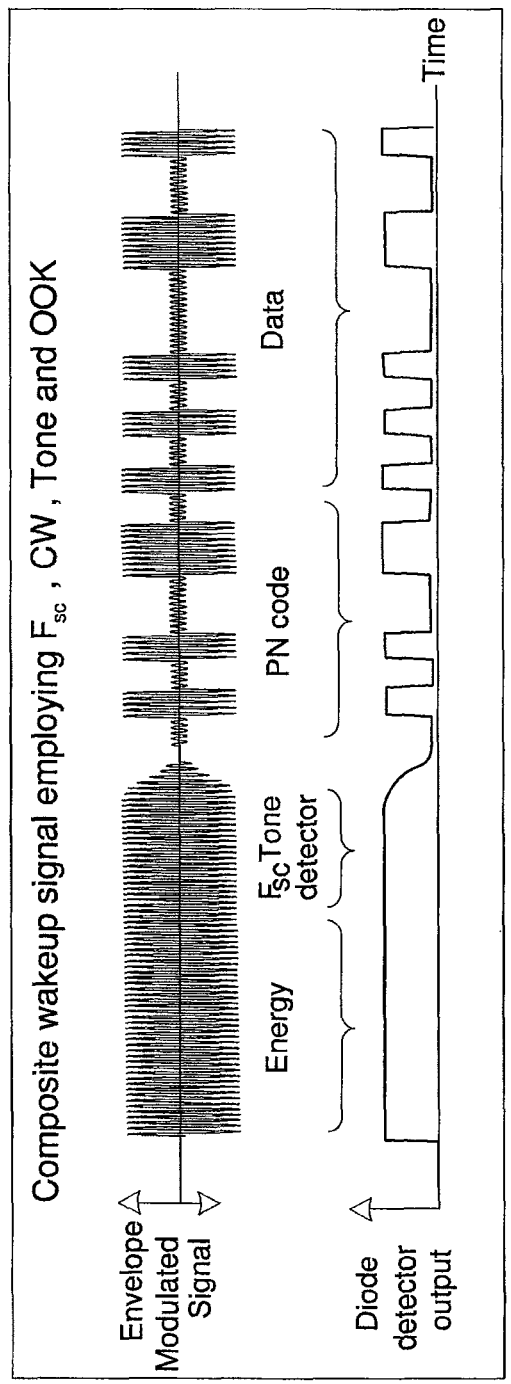
FIG. 16(f) illustrates an envelope-modulated signal with sub-carrier modulation including a composite modulation scheme involving CW, sub-carrier tone detection, and OOK schemes.

FIGS. 16(a) through (f) illustrate a number of envelope-modulated signals with sub-carrier modulation, including: FIG. 16(a) continuous wave (CW), FIG. 16(b) frequency or tone modulation, FIG. 16(c) PCM coding using OOK, FIG. 16(d) direct sequence PN coding using OOK, FIG. 16(e) a composite modulation scheme involving CW, tone and OOK schemes and FIG. 16(f), a composite modulation scheme involving CW and $f_{sc}$ frequency detection, with no low frequency tone modulation, followed by an OOK modulation scheme (e.g., a pseudorandom-noise (PN) code modulation and data). The demodulator output and decoder output signals are also shown.

In a multi-tier radio system of the present invention, signaling (i.e., waveform) may be designed to initially use a 'wakeup friendly' modulation aimed at the non-heterodyne receiver. Suitable modulations include energy sense, long tone and long PN sequence. The function of the relatively simple modulation is to trigger the non-heterodyne receiver to change its operating mode to a higher gain, or to activate a different filter or demodulator at the cost of temporarily increasing power consumption in the non-heterodyne receiver.

An AM receiver in a multi-tier radio system of the present invention may include multiple detectors to accommodate a composite signal, modulated waveform. Suitable modulation may involve one or more of the following modulation schemes (data are typically encoded as OOK or ASK):

a. Energy sense (Carrier CW) or sub-carrier frequency detection (using notch filter);
b. Carrier energy sense (Carrier CW), sub-carrier energy sense (Sub-carrier CW);
c. Carrier energy sense (Carrier CW), sub-carrier energy sense (Sub-carrier CW), data;
d. Sub-carrier energy sense (sub-carrier CW), data;
e. Sub-carrier energy sense (sub-carrier CW), pseudorandom-noise (PN-Code) combined with on-off keying (OOK);
f. Carrier energy sense (Carrier CW), sub-carrier energy sense (Sub-carrier CW), pseudorandom-noise (PN-Code) combined with on-off keying (OOK);
g. Carrier energy sense (Carrier CW), pseudorandom-noise (PN-Code) combined with on-off keying (OOK), data;
h. Carrier energy sense (Carrier CW), sub-carrier energy sense (Sub-carrier CW), pseudorandom-noise (PN-Code) combined with on-off keying (OOK), data;
i. Sub-carrier energy sense (Sub-carrier CW), pseudorandom-noise (PN-Code) combined with on-off keying (OOK), data;
j. Carrier energy sense (Carrier CW), single tone;
k. Sub-carrier energy sense (Sub-carrier CW), single tone;
l. Carrier energy sense (Carrier CW), single tone, data;
m. Sub-carrier energy sense (Sub-carrier CW), single tone, data;
n. Carrier energy sense (Carrier CW), single tone, pseudo-random-noise (PN-Code) combined with on-off keying (OOK);
o. Subcarrier energy sense (Sub-carrier CW), single tone, pseudorandom-noise (PN-Code) combined with on-off keying (OOK);
p. Carrier energy sense (Carrier CW), single tone, pseudo-random-noise (PN-Code) combined with on-off keying (OOK), data;
q. Subcarrier energy sense (Sub-carrier CW), single tone, pseudorandom-noise (PN-Code) combined with on-off keying (OOK), data.
r. Carrier energy sense (Carrier CW), multiple tones in time sequence;
s. Subcarrier energy sense (Sub-carrier CW), multiple tones in time sequence;
t. Carrier energy sense (Carrier CW), multiple tones in time sequence, data;
u. Subcarrier energy sense (Sub-carrier CW), multiple tones in time sequence, data;
v. Carrier energy sense (Carrier CW), multiple tones in time sequence, pseudorandom-noise (PN-Code) combined with on-off keying (OOK);
w. Subcarrier energy sense (CW modulation), multiple tones in time sequence, pseudorandom-noise (PN-Code) combined with on-off keying (OOK);
x. Carrier energy sense (Carrier CW), multiple tones in time sequence, pseudorandom-noise (PN-Code) combined with on-off keying (OOK), data;
y. Subcarrier energy sense (Sub-carrier CW), multiple tones in time sequence, pseudorandom-noise (PN-Code) combined with on-off keying (OOK), data;
z. Carrier energy sense (Carrier CW), multiple tones at the same time;
aa. Subcarrier energy sense (Sub-carrier CW), multiple tones at the same time;
bb. Carrier energy sense (Carrier CW), multiple tones at the same time, data;
cc. Subcarrier energy sense (Sub-carrier CW), multiple tones at the same time, data;
dd. Carrier energy sense (Carrier CW), multiple tones at the same time, pseudorandom-noise (PN-Code) combined with on-off keying (OOK);
ee. Subcarrier energy sense (Sub-carrier CW), multiple tones at the same time, pseudorandom-noise (PN-Code) combined with on-off keying (OOK);
ff. Carrier energy sense (Carrier CW), multiple tones at the same time, pseudorandom-noise (PN-Code) combined with on-off keying (OOK), data;
gg. Subcarrier energy sense (Sub-carrier CW), multiple tones at the same time, pseudorandom-noise (PN-Code) combined with on-off keying (OOK), data;
hh. Subcarrier energy sense (Sub-carrier CW), pseudorandom-noise (PN-Code) combined with frequency-shift keying (FSK);
ii. Subcarrier energy sense (Sub-carrier CW), pseudorandom-noise (PN-Code) combined with frequency-shift keying (FSK), data;
jj. Subcarrier energy sense (Sub-carrier CW), single tone, pseudorandom-noise (PN-Code) combined with frequency-shift keying (FSK);
kk. Subcarrier energy sense (Sub-carrier CW), single tone, pseudorandom-noise (PN-Code) combined with frequency-shift keying (FSK), data;

ll. Subcarrier energy sense (Sub-carrier CW), multiple tones in time sequence, pseudorandom-noise (PN-Code) combined with frequency-shift keying (FSK);

mm. Subcarrier energy sense (Sub-carrier CW), multiple tones in time sequence, pseudorandom-noise (PN-Code) combined with frequency-shift keying (FSK), data;

nn. Subcarrier energy sense (Sub-carrier CW), multiple tones at the same time, pseudorandom-noise (PN-Code) combined with frequency-shift keying (FSK); and oo. Subcarrier energy sense (Sub-carrier CW), multiple tones at the same time, pseudorandom-noise (PN-Code) combined with frequency-shift keying (FSK), data.

A non-heterodyne radio receiver of the present invention may further filter interference signals using one or more of the following techniques:
  a. use of RF carrier signals sub-modulated with one or more tones;
  b. use of one or more narrow filters to select desired tones;
  c. use of one or more narrow band filters, based on piezoelectric crystals, to select the desired tones;
  d. use of one or more narrow band filters, based on piezoelectric crystals, to accept unwanted tones and to determine detection threshold.

A non-heterodyne radio receiver of the present invention may further filter interference signals using a modulated signal that carries digital data with distinct codes. Suitable codes include one or more of the following:
  a. Free standing Pulse-Code Modulation (PCM) code;
  b. Pulse-Code Modulation (PCM) code, corresponding to a distinct receiver ID (instance model);
  c. Pulse-Code Modulation (PCM) code, corresponding to information types (i.e., information subscription model).

A non-heterodyne radio receiver of the present invention may further filter interference signals using a modulated, digitally coded signal for error reduction. Any error correction code may be used with the non-heterodyne radio receiver. Some examples for correction codes include: (a) data bit stream with forward error correction (FEC) and (b) data bit stream with a pseudorandom-noise (PN) spreading code.

Despite not being expressly shown in the figures, other functional elements may include, for example, a Voltage-Controlled Oscillator (VCO). VCOs are customarily used in frequency-modulation (FM) circuits, frequency synthesis and in digital applications such as frequency-shift keying (FSK) and phase modulation (PM). Other functional elements that may be common or shared by the multi-tier radio system are the control or sequencing logic circuits.

The following are examples of functional elements that may also be shared in a multi-tier, hierarchical radio system of the present invention:
  a. low noise radio-frequency (RF) amplifier;
  b. RF power amplifier;
  c. local oscillator;
  d. voltage-controlled oscillator (VCO);
  e. phase-locked loop (PLL);
  f. amplifier;
  g. control/sequencing logic and control/sequencing logic circuit;
  h. voltage regulator;
  i. power supply;
  j. antenna;
  k. filters.

Digital decoding is an effective way to increase receiver SNR for the wakeup (i.e. turn 'on') signal. Given that only a very small data payload needs to be received (in the best case, just one single bit), the modest sensitivity of a crystal-detector based receiver may be augmented by trading-off the moderate communication bandwidth for modulation that can be decoded by another detector (i.e., gaining SNR within the Shannon-Hartley law) and matching the communication range sensitivity of both the Tier-1 and Tier-2 receiver channels.

Figure 17A:
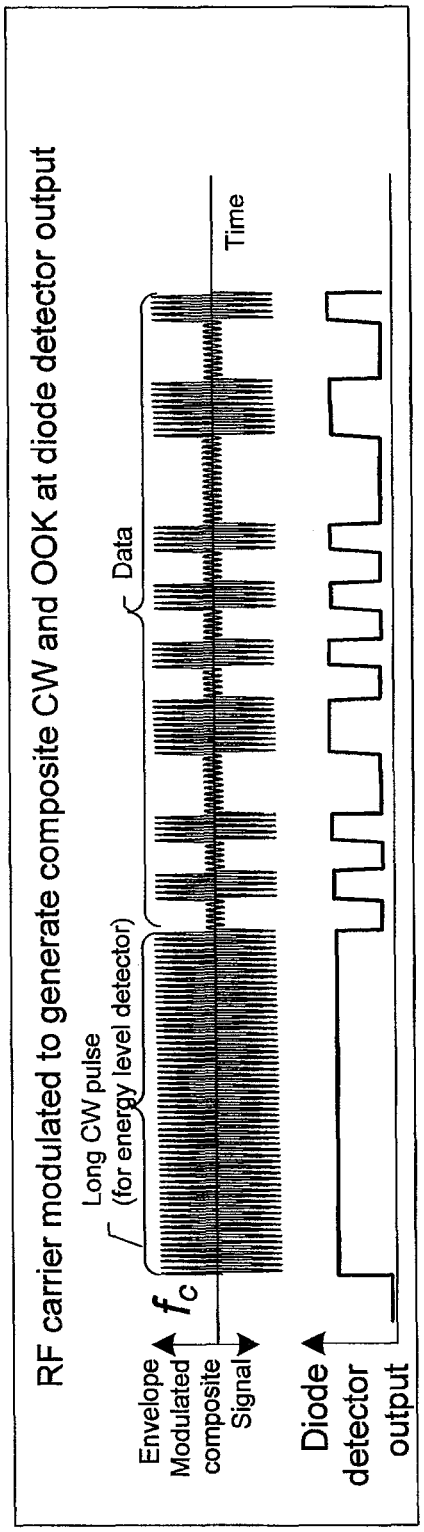
FIGS. 17(a), 17(b), and 17(c) show three examples of composite signal modulation schemes that may be used to provide an air interface for a Tier-1, non-heterodyne receiver, in accordance with one embodiment of the present invention.
Figure 17B:
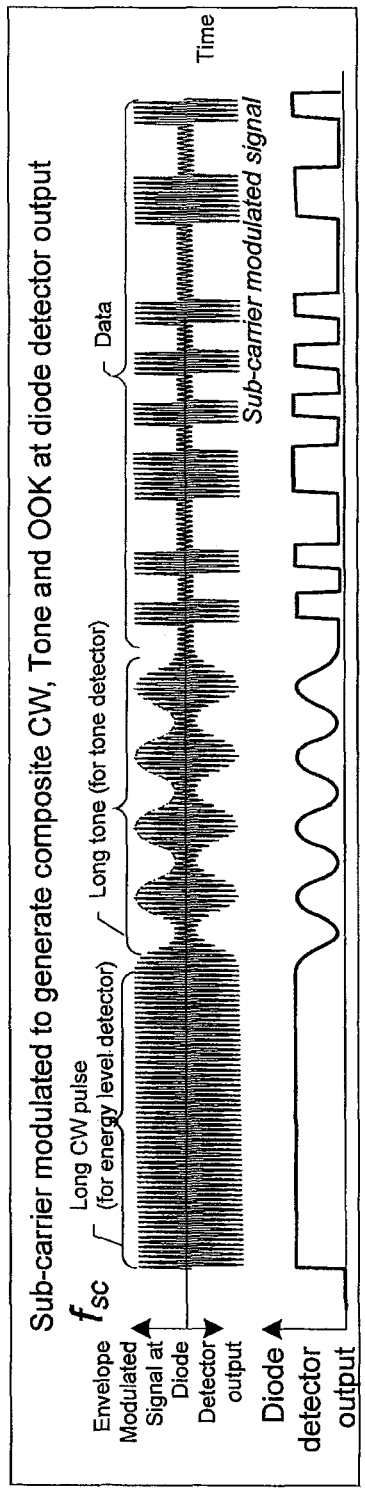
Figure 17C:
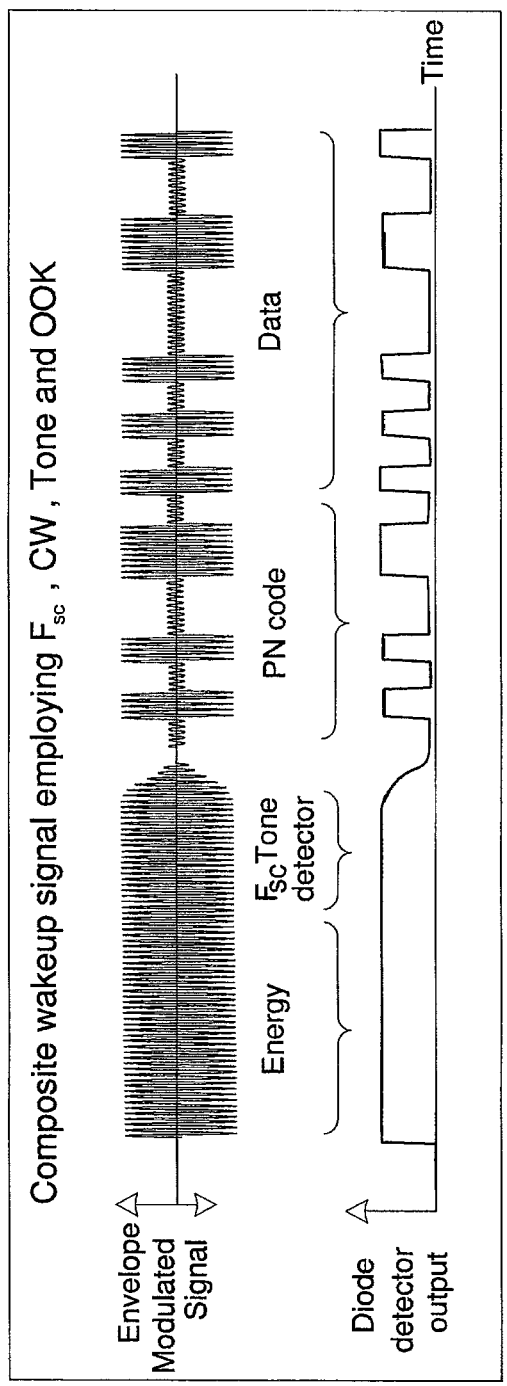

FIGS. 17(a), 17(b) and 17(c) show three examples of composite signal modulation schemes that may be used to provide an air interface for a Tier-1, non-heterodyne receiver, in accordance with one embodiment of the present invention. One advantage of this air interface is its simplicity and ease of implementation, while being robust and flexible. The three examples are the composite modulation schemes already shown above as FIGS. 15(e), 16(e), and 16(f). In FIG. 17(a) the composite modulation directly modulates a long CW pulse onto an RF carrier signal, followed by PCM/OOK modulation in which the PCM coded data are modulated by OOK onto the RF carrier. In FIG. 17(b) the composite modulation scheme modulates a long CW pulse onto a subcarrier signal, followed by a period of frequency or tone modulation onto the subcarrier signal, then followed by PCM/OOK modulation onto the subcarrier signal. In FIG. 17(c), the composite modulation scheme modulates a long CW pulse onto a subcarrier signal, followed directly by the PCM/OOK modulation without performing a low frequency tone modulation on the subcarrier signal. This method uses the subcarrier's tone itself for detection. In all three cases, the long CW pulse can be easily resolved by a low power analog detector (e.g., a diode detector), even in poor signal to noise ratio conditions. The frequency or tone modulation can also be easily detected using a frequency discriminator. Successful detection by these analog detectors may then activate a digital decoder to receive digital data in the PCM/OOK portion of the signal.

Alternatively, instead of the PCM/OOK modulation scheme, data may also be encoded in any amplitude modulation or phase/frequency modulated baseband signal. Digital data encoding provides greater reliability. The data packets may be encoded for error detection, error correction or both, using one or more data integrity techniques, such as parity, Hamming or error correcting code (ECC) or forward error correction (FEC).

Figure 18A:
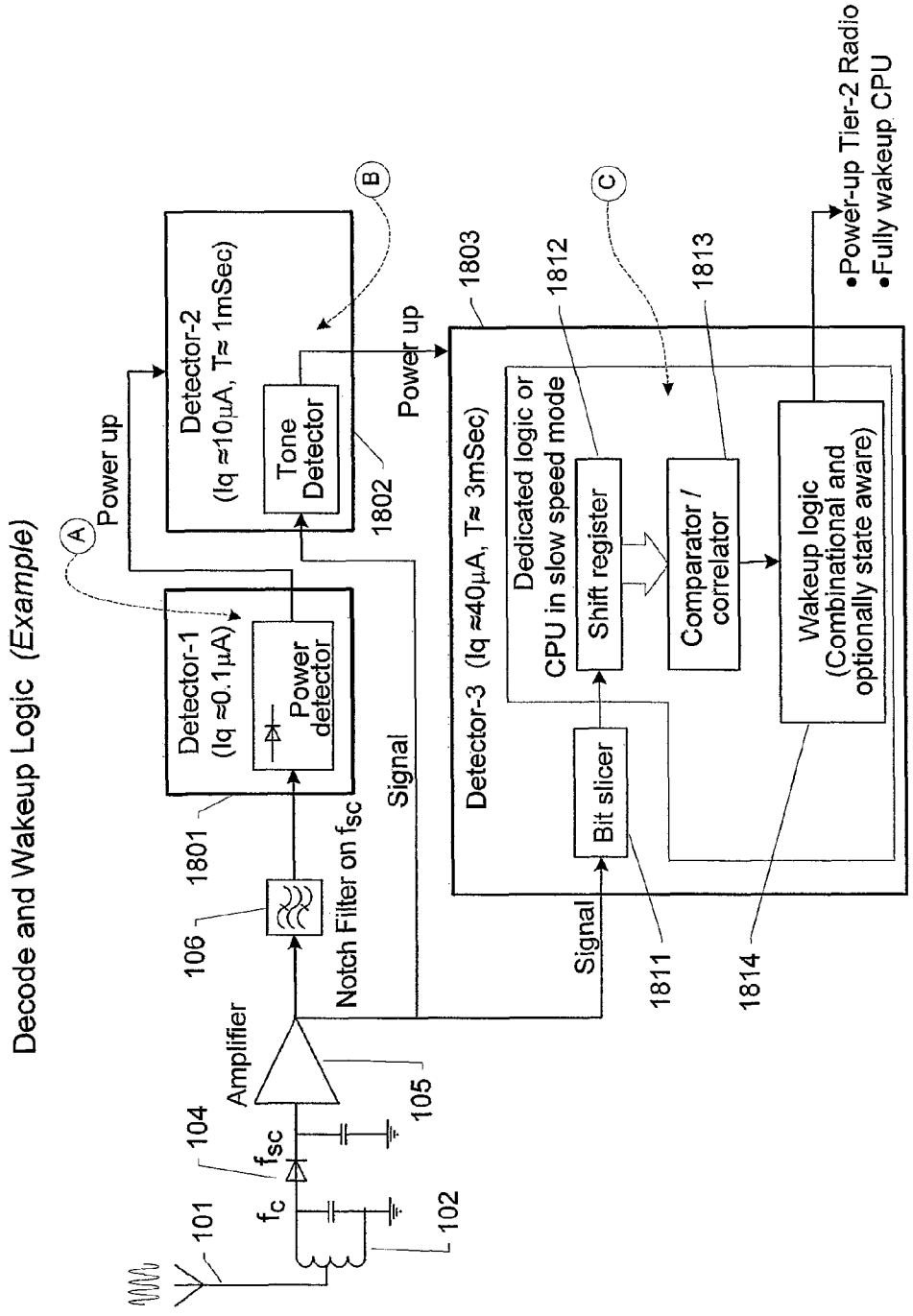
FIG. 18(a) shows a non-heterodyne receiver suitable for use for demodulating and decoding the signal of FIG. 17(b) and the signal of FIG. 18(b), in accordance with one embodiment of the present invention.
Figure 18B:
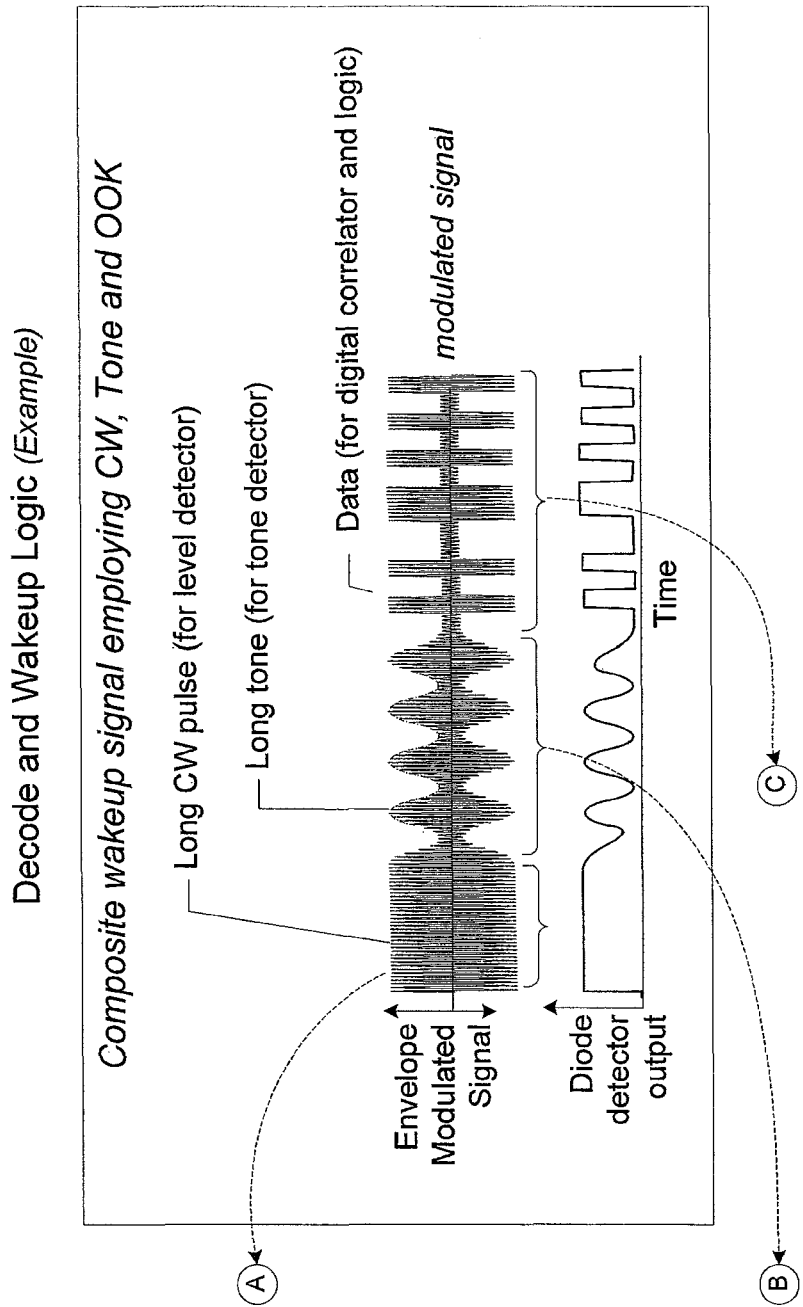
FIG. 18(b) shows a signal as in FIG. 17(b), to be used by the non-heterodyne receiver in FIG. 18(b).

FIG. 18(a) shows an ELP receiver suitable for use in demodulating and decoding the signal of FIG. 17(b) or FIG. 18(b), in accordance with one embodiment of the present invention. As shown in FIG. 18(a), the subcarrier modulated signal is sequentially demodulated and decoded using power detector 1801, tone detector 1802 and digital detector 1803, each being more sophisticated than the previous demodulation or decoding circuit but each being more power demanding (e.g., requires higher current) than the previous demodulation or decoding circuit. Power detector 1801 detects the long subcarrier CW pulse. Tone detector 1802 detects the tone modulated portion of the signal. Digital decoder 1803 decodes the PCM/OOK portion of the signal.

As shown in FIG. 18(a), initially only power detector 1801 is powered. Tone detector 1802 and digital decoder 1803 are both in power saving states. When the long subcarrier CW pulse is detected (e.g., using a diode detector), power detector 1801 causes tone detector 1802 to power up. Detection by tone detector 1802 of the frequency modulation (e.g., using a frequency discriminator), or long tone (B, cf. FIG. 18(b)), provides greater assurance that a bona fide communication request is received. Tone detector 1802 then causes digital decoder 1803 to be powered up and receive data (C, cf. FIG. 18(b)). As shown in FIG. 18(a), digital decoder 1803 includes bit slicer 1811 for identifying the individual bits that are encoded, shift register 1812 and comparator/correlator 1813 to match the received bits against a stored predetermined codeword, and logic circuit 1814 to power up more sophisticated circuits (e.g., a Tier-2 receiver, such as a heterodyne receiver, MCU or ADC) to further process the received signal. Comparator/correlator 1813 may also be used to compare the received data against an identify code assigned to the receiver. (The ID may also be in the form of a PN code). A match indicates that the communication request is directed towards the present receiver. The Tier-2 receiver may then take over to conduct the requested communication.

In one embodiment, power detector 1801 operates at a low current level, (e.g. approximately 0.1 µA). Tone detector 1802 requires a relatively higher current to operate (e.g., ~10 µA) and for a relatively longer period of time (e.g. 1 ms). Digital decoder 1803 requires an even higher current for operation (e.g. 40 µA) and an even longer period of time (e.g., approximately 10 ms). This progressive increase in power requirement, albeit at very low duty cycle, results in a much smaller increase in overall power footprint.

Figure 19A:
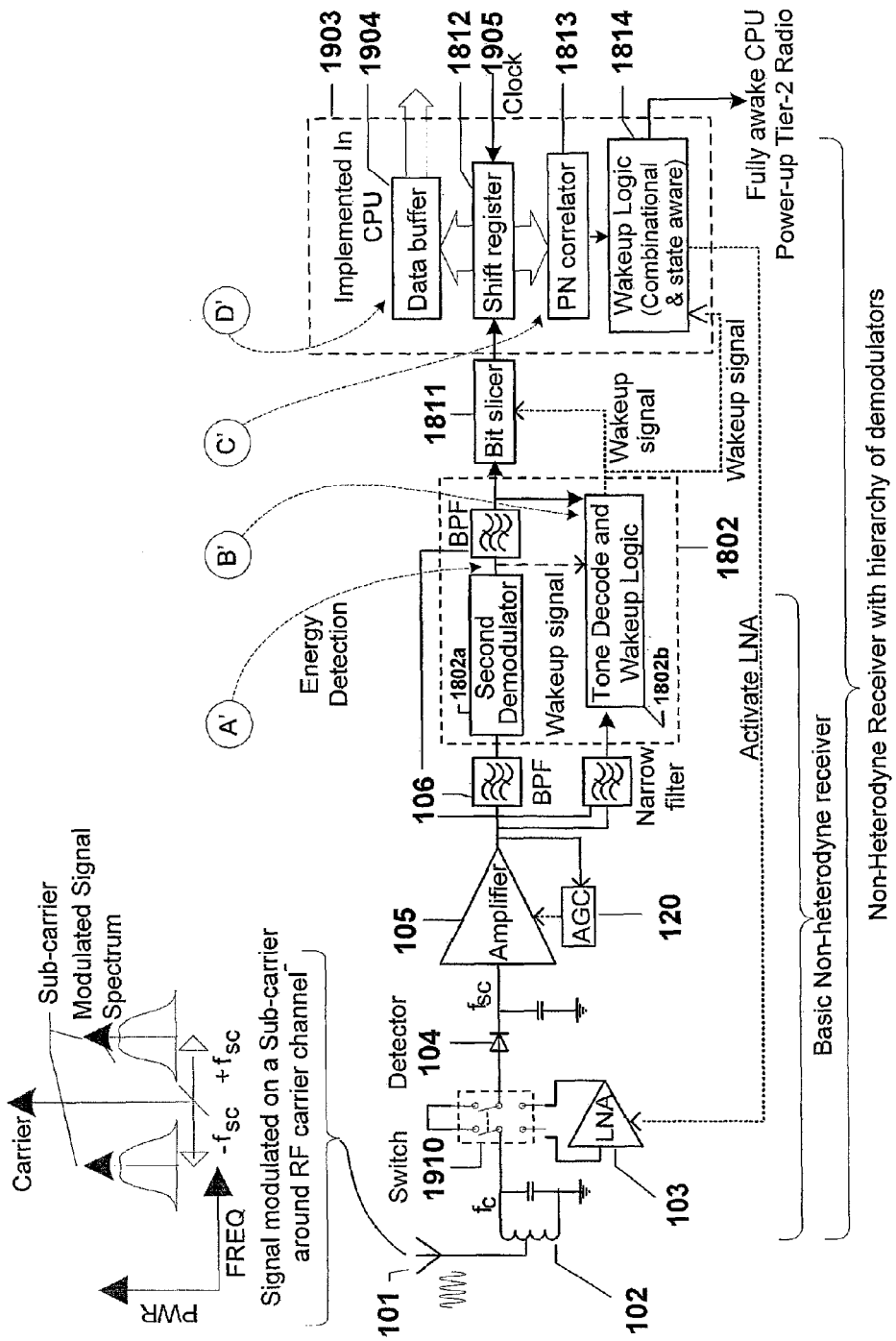
FIG. 19(a) is a block diagram of a non-heterodyne receiver which can be used to implement a Tier-1 receiver.
Figure 19B:
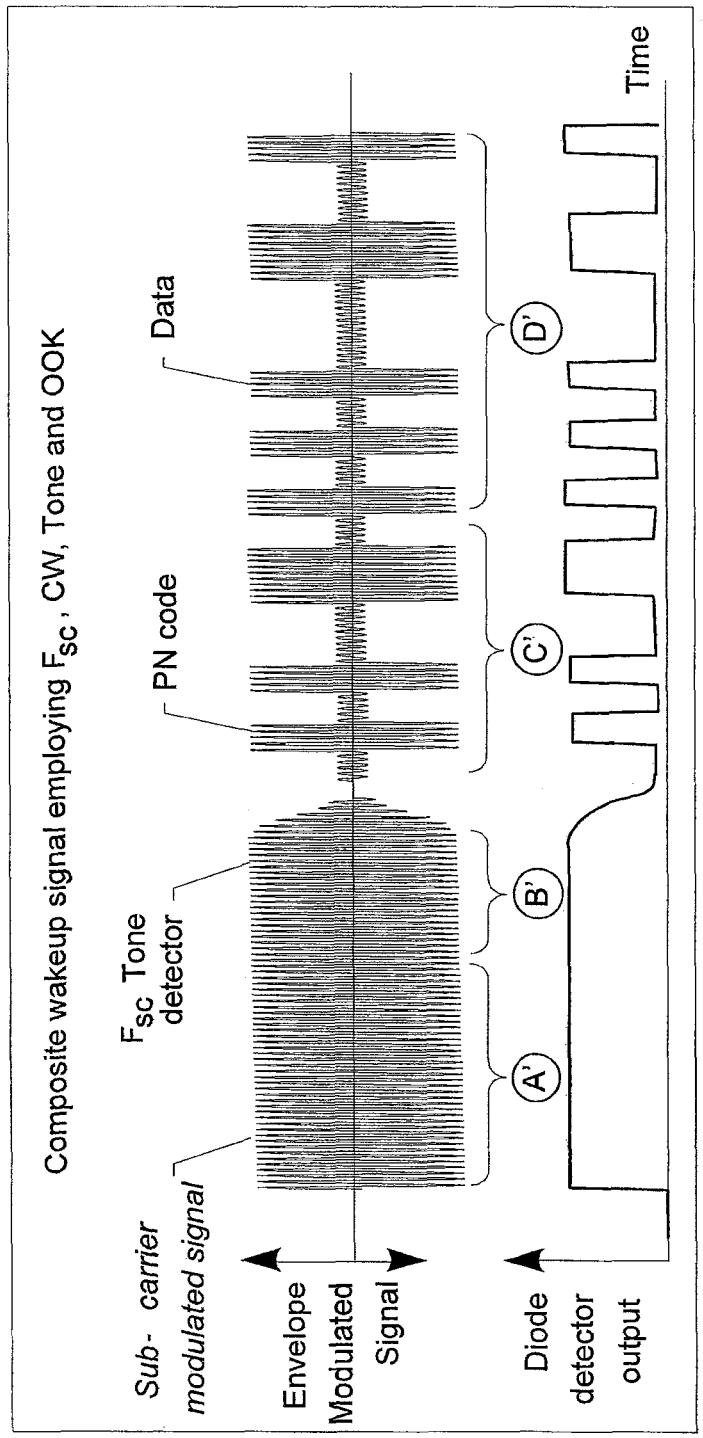
FIG. 19(b) shows a signal as in FIG. 17(c), to be used by the non-heterodyne receiver of FIG. 19(a).

FIG. 19(*a*) shows an ELP receiver suitable for use in demodulating and decoding the signal of FIG. 17(*c*) or FIG. 19(*b*), in accordance with yet another embodiment of the present invention. (Note: Like elements in FIGS. 18(*a*) and 19(*a*) are assigned the same reference numerals and thus their operations are not described in the following paragraphs to avoid repetition.) As shown in FIG. 19(*a*), the subcarrier modulated signal (A', cf. FIG. 19(*b*)) is sequentially demodulated and decoded using demodulator 1802*a*; the fsc tone decode and wakeup logic circuit is 1802*b*, and the digital detector is 1903. 1802*a* demodulates the sub-carrier and generates the baseband signal that is also used by wakeup logic circuit 1802*b*. 1802*b* also measures the energy of the sub-carrier. Note that 1802*b* essentially measures the sub-carrier energy coming from the narrow band filter that is tuned for sub-carrier frequency fsc (B', cf. FIG. 19(*b*)). Those of ordinary skill in the art would recognize that fsc is normally much higher in frequency than the tone modulation used in the embodiment depicted in FIG. 18(*a*) and processed by tone detector 1802*b*, thus it is quicker to measure. In one exemplary embodiment, subcarrier frequency fsc may be approximately 100 kHz while the tone modulation of FIG. 18(*b*) could be approximately 10 kHz. The tone decode and wakeup logic circuit 1802*b* causes bit slicer 1811 and digital decoder 1903 to be powered up. Digital decoder 1903 includes a shift register 1812 that receives an external clock signal 1905. As in FIG. 18(*a*), the correlator 1813 and the wakeup logic circuit 1814 decode the PN portion of the signal (C', cf. FIG. 19(*b*)) and fully power up the CPU and Tier-2 radio. In addition to this, the shift register 1812 in digital decoder 1903 generates a data buffer 1904 that receives the data payload (D', cf. FIG. 19(*b*)) following the PN code in the composite waveform that can be stored in memory for further processing by the CPU.

The ELP receiver circuit according to the embodiment depicted in FIG. 19(*a*) also includes a switch 1910 that enables the signal from the antenna 101, after passing through the channel-tuning element 102, to be pre-amplified by a low noise amplifier (LNA) 103, before the signal passes through detector 104. The switch 1910 is activated once it is confirmed that a bona fide communication request is received and Tier-2 receiver is fully powered up. This arrangement results in an enhanced SNR for communication, with low energy consumption because the LNA 103 is only powered up when the signal has been validated by all stages of the non-heterodyne receiver. The enhanced SNR yields greater channel capacity; thus, the received data bit rate can be higher, with superior BER.

Figure 20B:
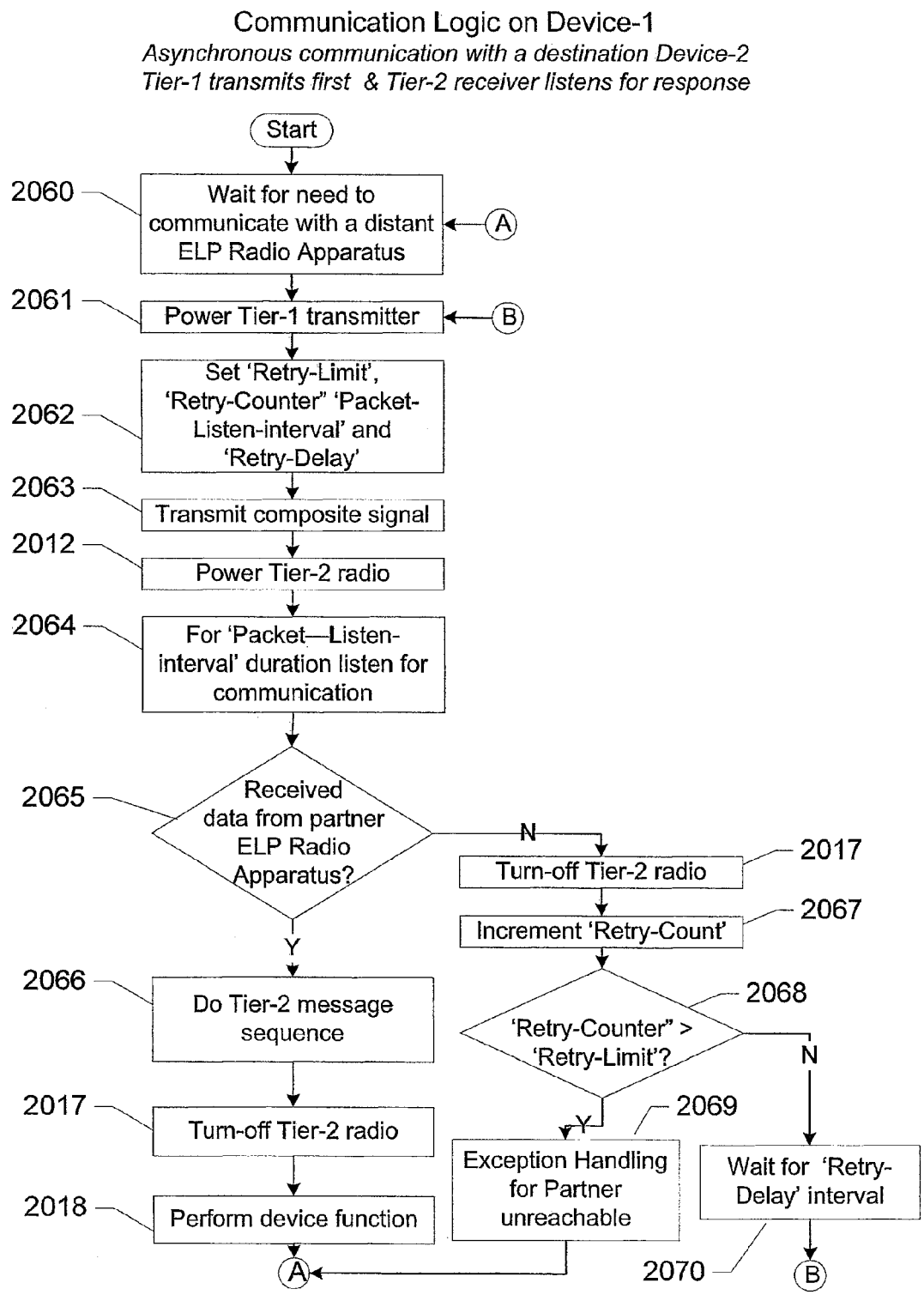
FIG. 20(b) is a flow chart that illustrates the operation of communication logic of an appliance that wishes to asynchronously initiate communication with a partner ELP radio communication system.
Figure 20C:
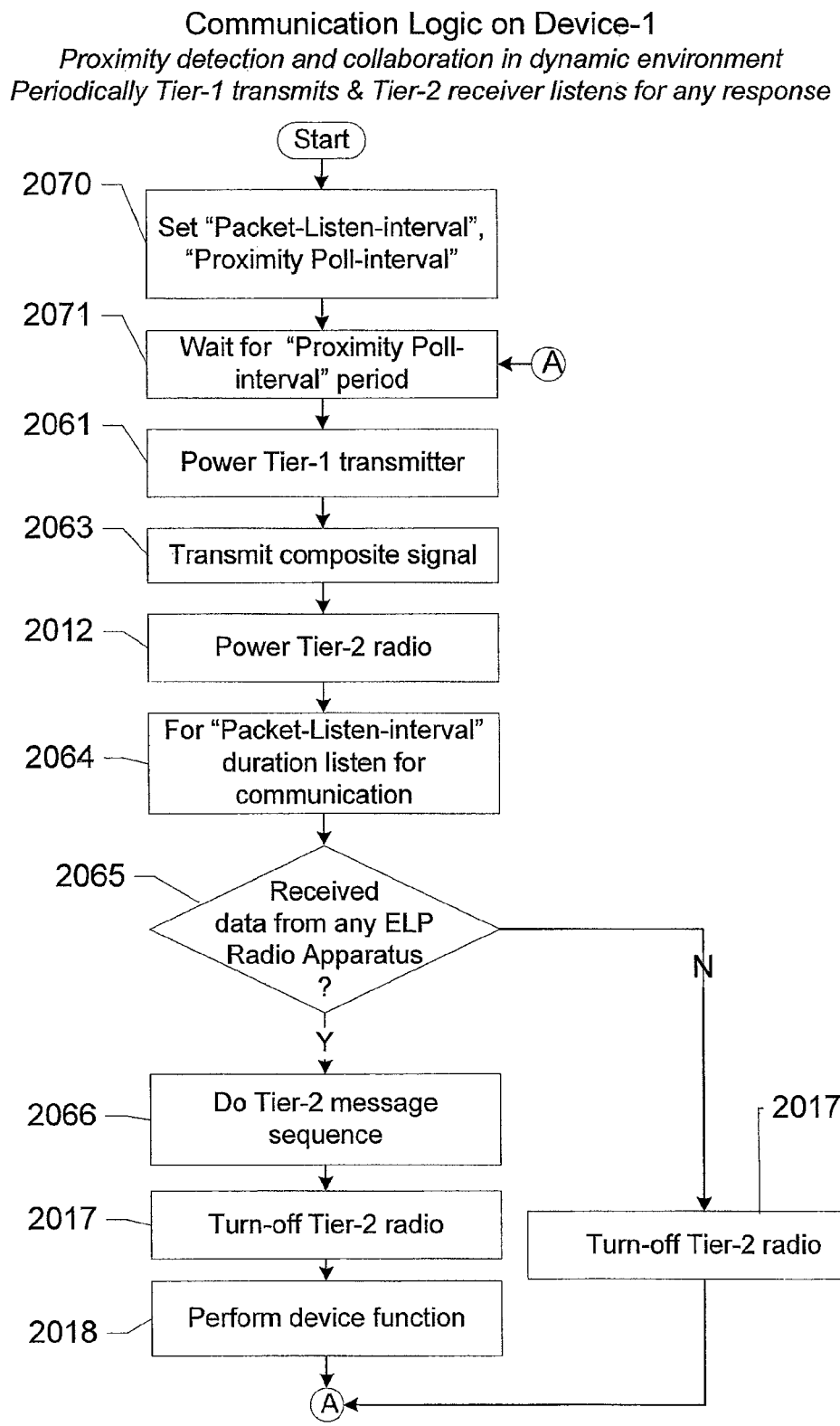
FIG. 20(c) is another flow chart that illustrates the operation of communication logic for an appliance that uses an ELP radio communication system and in a dynamic environment, continuously polls to detect a partner ELP radio communication system and collaborates with it.

FIGS. 20(*a.i*)-(*a.ii*) include two flow charts for illustrating the operation of a communication logic circuit in an ELP transceiver using the Tier-2 circuit to perform destination filtering (i.e., determining whether a communication request is directed to it) and the Tier-1 circuit to perform destination filtering, in accordance with the present invention. As shown in FIG. 20(*a*)(*i*), at step 2001, the ELP transceiver is in a quiescent state (e.g., in a listen mode with only an energy detector in the Tier-1 circuit powered). The ELP transceiver remains in this state until (step 2002) the output value of the energy detector exceeds a threshold. At procedure 2003, shown in FIG. 20 as steps 2004-2008, the ELP transceiver activates the next higher level detector to resolve the next signal feature in the received signal. At step 2004, the next higher level detector is activated, which may also set a timer and a threshold (step 2005) as appropriate. If the timer expires without resolution of the next signal feature, this next level ELP detector is deactivated and the ELP transceiver returns to step 2001. At step 2007, while the timer has not expired, this next level detector determines if the signal feature assigned to it has been resolved (i.e., the detector's threshold is reached). When the detector's threshold is reached, the timer is reset (step 2008) and the ELP transceiver activates a third level of detection. In this manner, depending on the signal convention, there may be a number of successively more sophisticated detectors, each carrying out detection of successive signal features. Each such detector would be directed by a procedure (indicated in FIG. 20(*a*)(*i*) as procedure 2009) of the type described above with respect to procedure 2003. Digital data decoding (e.g., PCM/OOK coded or ASK coded data) may also be provided in the Tier-1 circuit (2010).

When all signal features resolved by the Tier-1 circuit of the ELP transceiver are resolved, the Tier-1 circuit is disabled (step 2011). At step 2012, a Tier-2 circuit is activated. Upon activation, the ELP transceiver broadcasts a message using the Tier-2 circuit to inquire about the communication request and may provide its own status information to the communication requester (step 2013). The Tier-2 circuit then waits to receive a message from the communication requester (step 2014). At step 2015, destination filtering is performed (i.e. the requester may send a message to indicate whether or not this ELP transceiver is its intended communication partner). If communication with the ELP transceiver is not intended, at step 2019, the Tier-2 circuit is deactivated and the Tier-1 circuit is reactivated, so that the ELP transceiver may return to state 2001. Otherwise, the ELP transceiver begins message exchange with the communication requester (step 2016). When communication completes, the Tier-2 circuit is deactivated (step 2017). In these communication systems, the ELP transceiver is part of an appliance that provides services requested over the communication conducted at step 2016. At step 2018, the appliance provides the requested service (e.g., open a garage door). One of ordinary skill in the art would recognize that the logic steps involved in FIG. 20(*a*)(*i*), as described above, impose a regime of more power consumption on the receiver device because higher power Tier-2 receiver is used for destination filtering.

FIG. 20(*a*)(*ii*) is a flow chart for a communication logic circuit in an ELP transceiver using the Tier-1 circuit to perform destination filtering. In FIG. 20(*a*)(*ii*), as indicated by steps 2001-2009, detection of signal features may proceed in substantially the same fashion as discussed in FIG. 20(*a*)(*i*). When digital data are exchanged using the Tier-1 circuit (step 2051), the communication requester may specify in the digital data its intended communication partner and/or other context information about the communication request. This may include, for example, a message encoding the purpose of the communication, e.g. a general broadcast event, a notification, an alarm message, or a proximity discovery message. At step 2052, the ELP transceiver determines if it is the intended communication partner and if needs to respond (based on context information). If not, the ELP transceiver returns to step 2001. Otherwise, the Tier-1 circuit is deactivated (step 2011) and the Tier-2 circuit is activated (step 2012). Since destination filtering is not be performed using the Tier-2 circuit, steps 2013-2015 are eliminated. Subsequent operations substantially follow steps 2016-2019 as described above. One of ordinary skill in the art would recognize that the steps involved in FIG. 20(*a*)(*ii*) impose a regime of more power consumption on the transmitter device and less power consumption on the receiving device.

Destination filtering in the Tier-1 circuit may be more efficient in avoiding false wakeup calls, but it requires more sophisticated digital data processing circuits at the Tier-1 level. Additional context information in the data payload may further minimize the need to respond by using the Tier-2 circuit (e.g. if it is a repeat broadcast or if it is a low priority, one way notification), or provide information to facilitate communication with the Tier-2 circuit (e.g. RF channel, encryption method, time delay, time slot etc).

FIG. 20(*b*) is a flow chart for illustrating the operations of an ELP radio communications device that wishes to contact a destination appliance. It uses a multi-tier architecture whereby a Tier-1 transmitter establishes initial communication with a destination appliance. The device is initially waiting for a need to communicate with a distant ELP radio apparatus (step 2060). When the device has a need to communicate, it powers up the Tier-1 transmitter (step 2061) and sets a number of parameters (step 2062). The device forms and transmits a composite signal to a communication partner (step 2063). The device then listens for any received messages, using the Tier-2 radio (step 2012). A 'Packet-Listen interval' timer is started (2064), during which time the Tier-2 radio waits and listens to receive a reply signal from a potential communication partner. If reply from a communication partner is received, a decision making step (2066) routes the device into performing a Tier-2 message sequence (2066), after which the Tier-2 radio is turned off (step 2017), and the device or appliance function is preformed (e.g. opening a garage door or unlocking another device). After the appliance function is completed, the ELP radio system returns to step 2060.

If at step 2066, data from an ELP communication partner is not received within the prescribed time, then the Tier-2 radio is turned off (step 2017) and a 'Retry-Count' counter is incremented (2067). If the 'Retry-counter' reaches the limit set by the 'Retry-limit' parameter, the communication partner is deemed unreachable, exception handling is performed per functional design requirement and the ELP radio device returns to step 2060. As long as the retry counter has not reached its limit, then the ELP radio waits for the 'retry delay interval' to lapse (step 2070), before retrying with a new sequence of powering Tier-1 transmitter beginning with (2061).

FIG. 20(*c*) is a flow chart for illustrating the operations of an ELP radio communication system that is capable of detecting proximity with another ELP radio communications device equipped with a Tier-1 receiver and communicating with it. This is typical of a dynamic environment involving relative position of devices as they move in and out of communication range. The procedure illustrated by the flow chart starts by setting parameters 'packet-listen interval' and 'proximity poll interval' (step 2070). After waiting for the proximity poll interval (step 2071), Tier-1 transmitter is turned on (step 2061) and a composite signal transmitted (step 2063). Tier-2 radio is turned on (2012) for a 'packet-listen interval' to try to listen for potential communication from a partner within communication range (2064). If a valid reply from another ELP radio apparatus is received during this period (2065), a decision is made to perform the Tier-2 message sequence (2066), turn off Tier-2 radio (2017) and perform the appliance function (2018) per design requirement. If a valid reply is not received, Tier-2 radio is immediately turned off (2017) and the system returns to step 2071 to wait for the next proximity poll-interval.

FIGS. 21(*a*)-(*b*) show flow charts for illustrating the operations of an ELP transceiver that is based on a timing system involving operation of a Tier-1 receiver in low duty cycle, in accordance with one embodiment of the present invention. As shown in FIGS. 21(*a*)-(*b*), an ELP transceiver includes a time-based signal that is received in an external timing message. In one embodiment of an ELP radio communication transceiver, such external timing may be provided by a communication partner or another device or clock in the local environment. Referring to FIG. 21(*a*), initially, at step 2101, the ELP transceiver sets a clock synchronization interval timer. When the clock synchronization timer expires (as confirmed by step 2102), the ELP transceiver activates a Tier-2 receiver circuit and sets a receiver timer (step 2103). Prior to expiration of the Tier-2 receiver timer (as confirmed by step 2104), the Tier-2 receiver checks for a timing message (step 2105). If the Tier-2 receiver timer expires without receiving a timing message, the ELP transceiver deactivates the Tier-2 receiver (step 2108) and returns to step 2102. Otherwise (i.e. a timing message is received), the receiver timing clock is adjusted to synchronize with the environment time received in the timing message (step 2107), Tier-2 receiver circuit is deactivated (step 2108) and the ELP transceiver returns to step 2102.

Figure 21A:
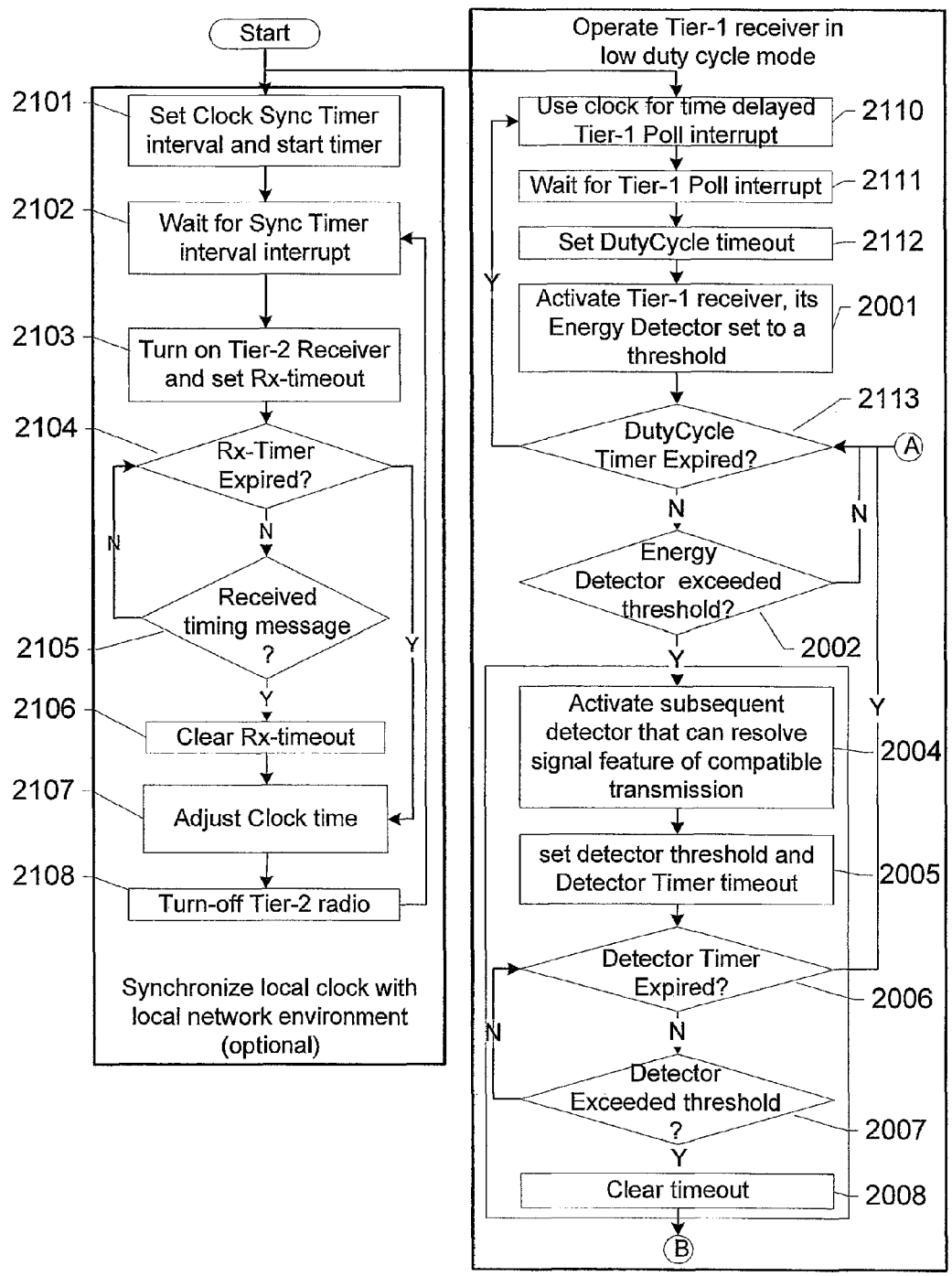
FIGS. 21(a)-(b) depict a flow chart that illustrates communication logic in an ELP transceiver whose Tier-1 receiver is operating in low duty cycle mode based on a timing system, in accordance with one embodiment of the present invention.

Simultaneously with the operation of clock synchronization, the Tier-1 receiver circuit is periodically activated every "poll interrupt" period (using the clock which in turn stays synchronized with environment's time base), polling for any ELP wakeup composite waveform broadcast ("poll interrupt"; steps 2110-2112). It is the responsibility of the broadcaster to ensure that broadcast is initiated at a time when other ELP transceivers in the environment have turned on their Tier-1 receiver. Prior to the Tier-1 circuit being activated (step 2001), at step 2112 a duty-cycle timer for the Tier-1 receiver circuit is set to ensure it stays operational for that period. Prior to the expiration of the duty-cycle timer, the Tier-1 circuit resolves signal features and performs Tier-1 digital data processing in the manner discussed above with respect to FIGS. 20(*a.i*) and 20(*a.ii*). Steps of signal resolution in the Tier-1 circuit in FIGS. 21(*a*)-(*b*) (e.g., steps 2001-2012) corresponding to those carried out in FIG. 20(*a*) are therefore provided the same reference numerals. Referring to FIG. 21(*b*), step 2009 is initiated after completion of step 2008 (cf. FIG. 21(*a*)) and repeats the macro step 2009 a number of times, N. During any of the iterations of steps 2004-2008 in the macro step 2009, if the detector does not successfully detect desired signal feature in set time control flows to step 2113 (cf. FIG. 21(*a*)). When the operations in the Tier-1 receiver complete, the Tier-2 receiver is activated and a Tier-2 receiver timer is set (step 2114). The Tier-2 receiver timer provides an interval during which the Tier-2 receiver circuit destination filtering is performed. Specifically, a message is received from the communication requester identifying the intended communication partner. At steps 2115 and 2116, if the Tier-2 receiver timer expires without receiving the message from the communication requester, the ELP transceiver returns to step 2113. Otherwise (i.e. such a message is received), the ELP transceiver resets the Tier-2 receiver timer (step 2117) and determines if it is the intended communication partner (step 2118). If so, data communication (step 2016) and performance of requested service (step 2018) are carried out in the manner discussed with respect to FIG. 20(a) above. The ELP transceiver then returns to step 2113 (cf. FIG. 21(a)).

Figure 21B:
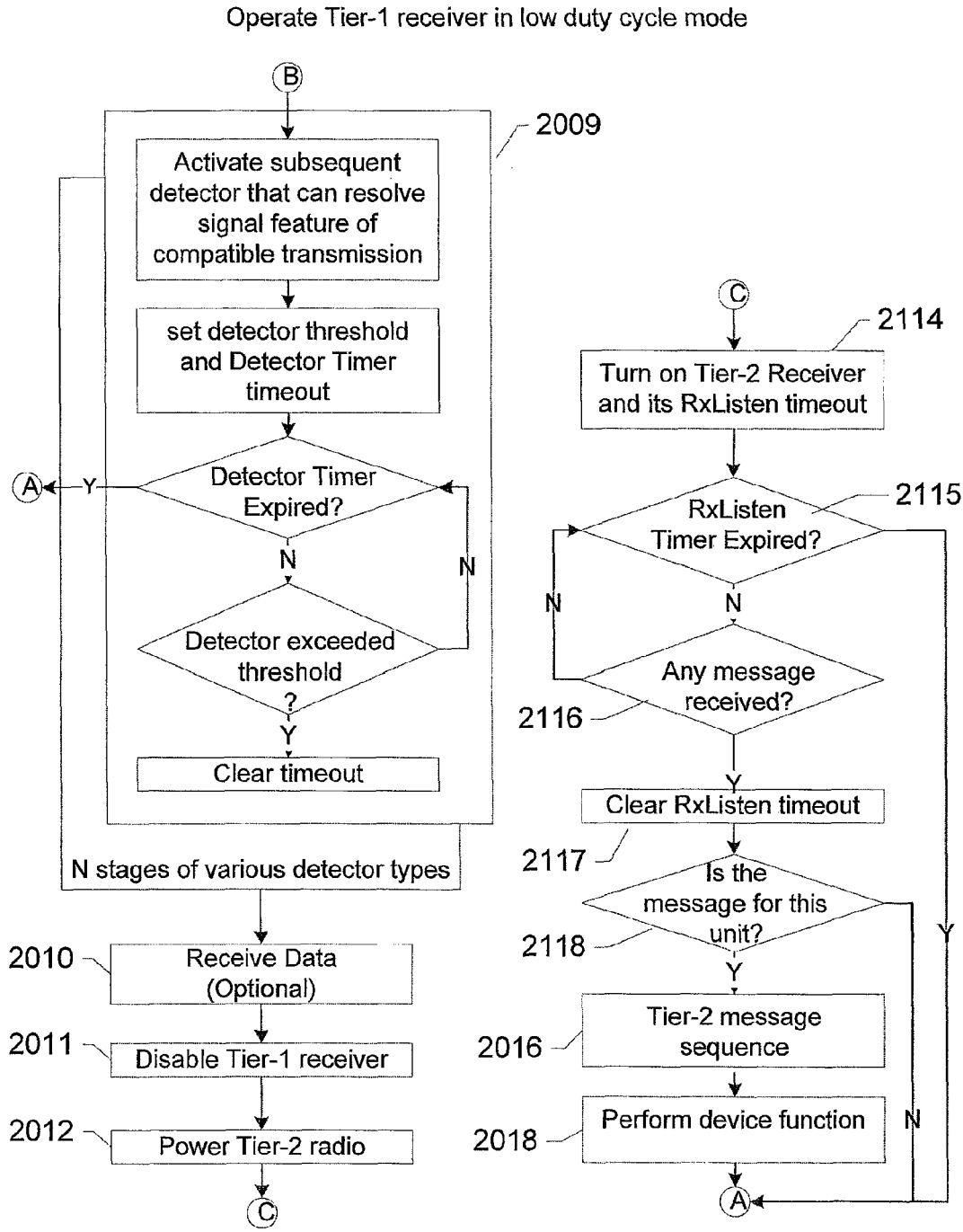

Using the method of FIGS. 21(a)-(b), even the low power Tier-1 circuit need not be powered all the time. Depending on the predetermined duty cycle, substantial power savings can be further realized.

Figure 22A:
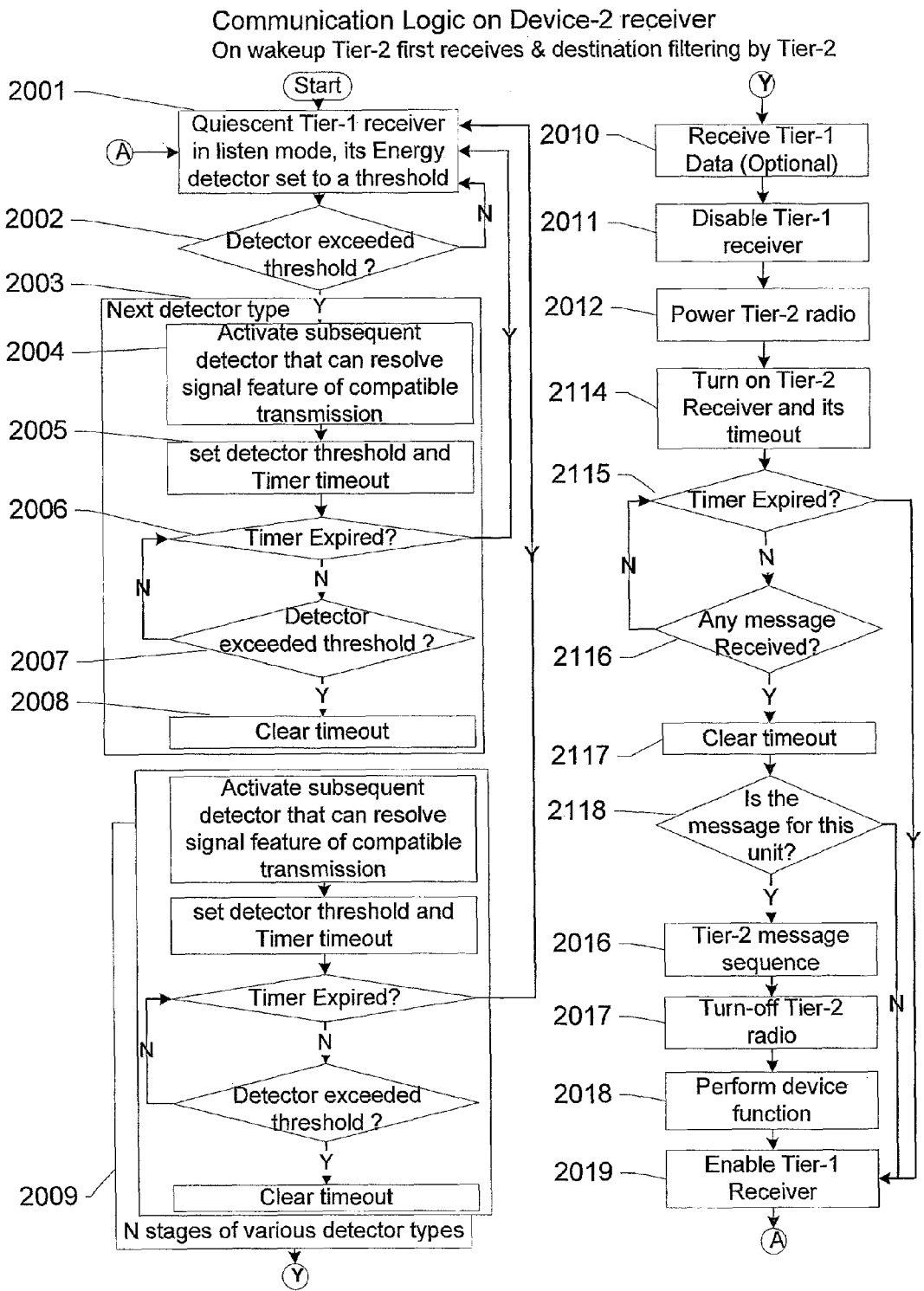
FIGS. 22(a)-(b) illustrate two flow charts for communication logic in an ELP transceiver where Tier-2 circuit first starts with a receive operation, in accordance with the present invention.
Figure 22B:
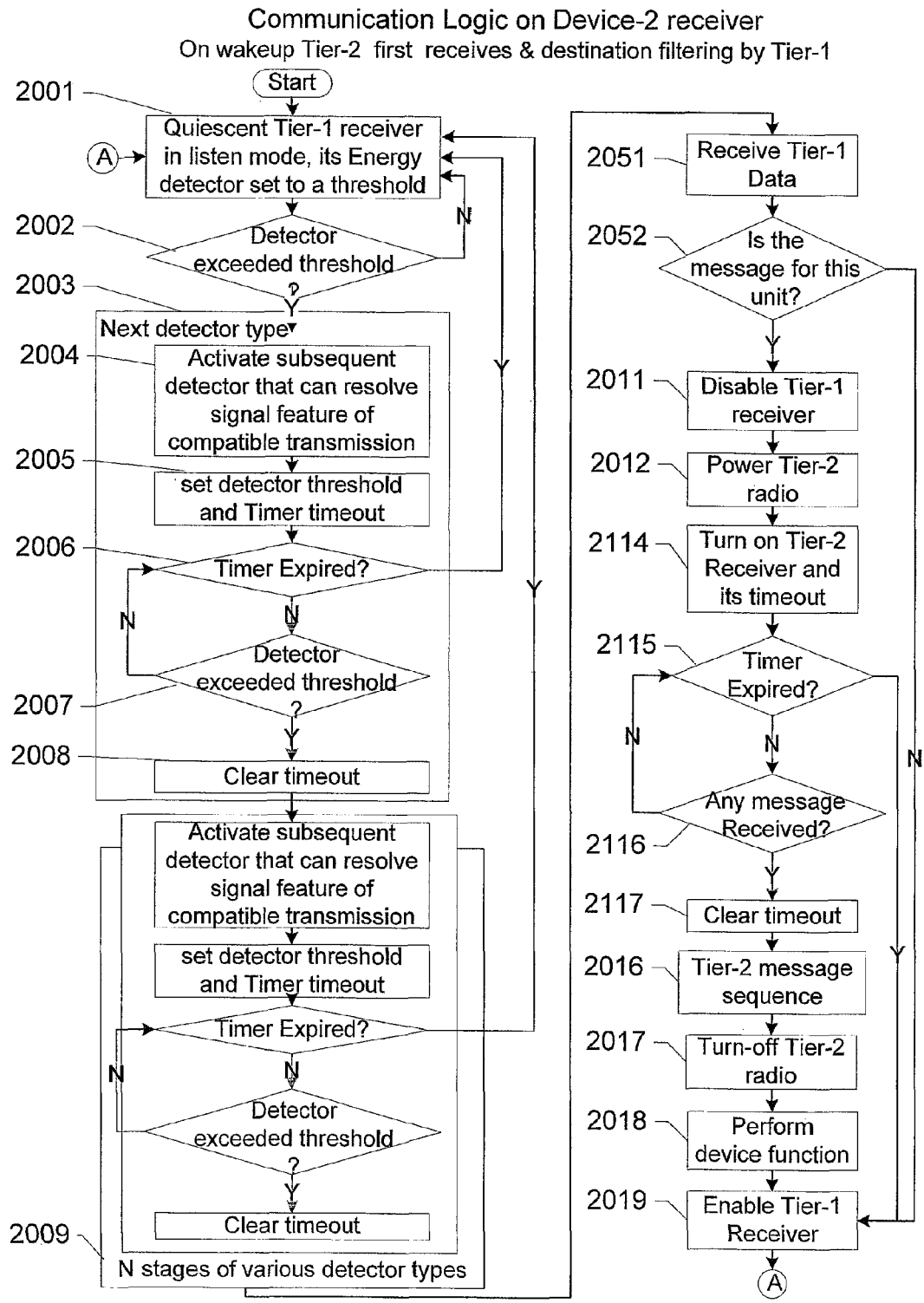

FIGS. 22(a)-(b) show flow charts for a communication logic circuit in an ELP transceiver which combines the approaches of FIGS. 20(a) and 20(b), but its Tier-2 circuit starts by first listening to a broadcast by the communication-originating partner in accordance with one embodiment of the present invention. This is useful for applications that require the originator to broadcast large context information so that a receiver can determine if it wishes to participate in Tier-2 communication. FIG. 22(a) shows a flow chart for an ELP transceiver that uses the Tier-2 circuit to perform destination filtering. Similarly, FIG. 22(b) shows a flow chart for illustrating the operations of an ELP transceiver that uses the Tier-1 circuit to perform destination filtering. Steps in FIGS. 22(a) and 22(b) that correspond to steps in FIGS. 20(a), 20(b) and 21(a)-(b) are provided the same reference numerals. The detailed description of these steps is therefore omitted.

Figure 23:
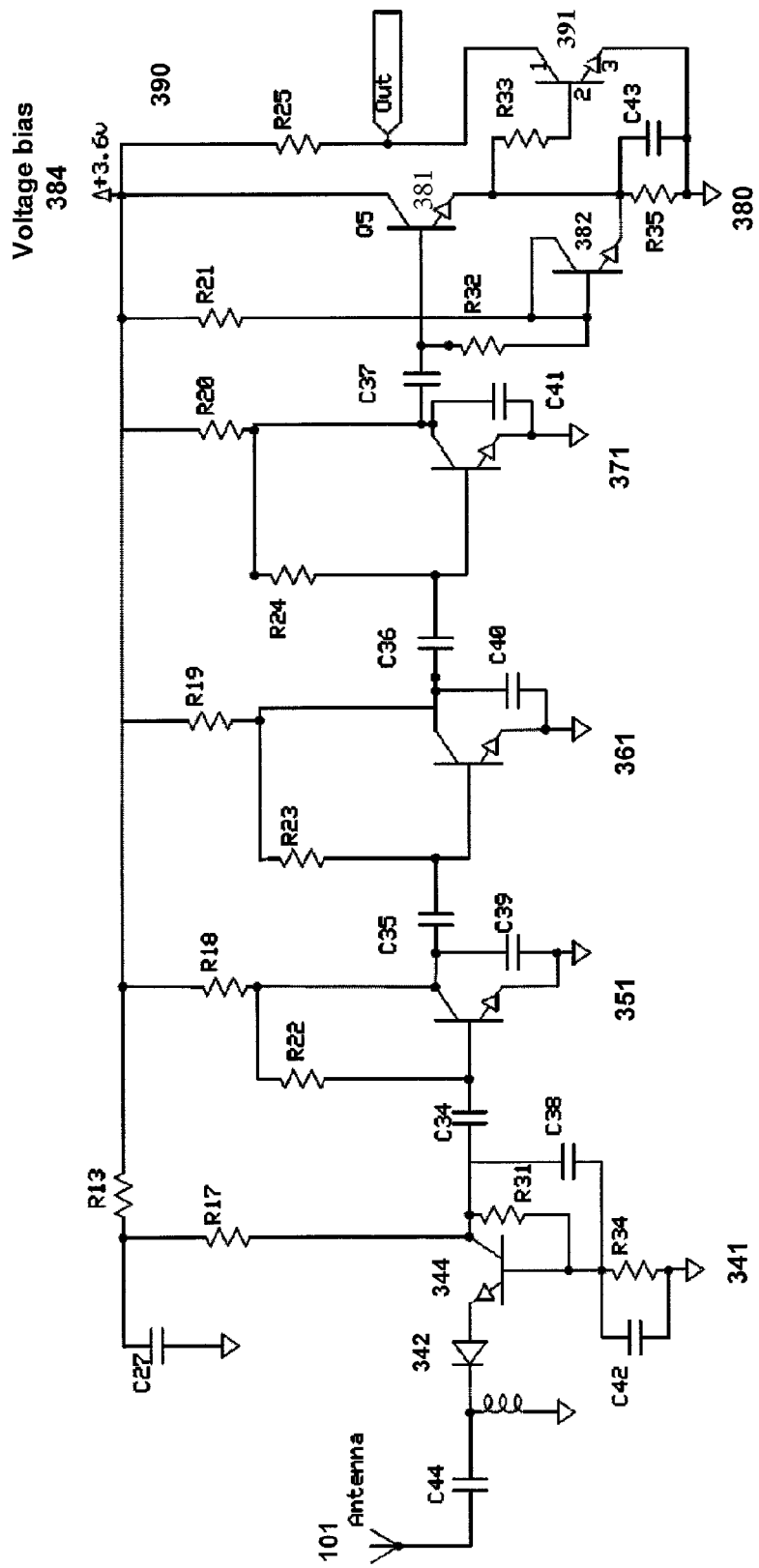
FIG. 23 is a circuit diagram illustrating a non-heterodyne receiver, in accordance with one embodiment of the present invention.

FIG. 23 is a circuit diagram of a non-heterodyne receiver according to one embodiment of the present invention. The circuit comprises a low power detector and amplifier stage 341, AC coupled amplifier stages 351, 361, and 371, a bootstrap integrating detector stage 380, and an amplifier stage 390. Each of the stages 341, 351, 361 and 371 is energized by power provided by a power supply 384. In the embodiment shown in FIG. 23, this power supply voltage is 3.6 V. The use of AC coupling amplifier stages is an important attribute of the embodiment described in FIG. 23 that provides a simpler way to realize desired signal amplification due to the removal of the DC offset and drift, and the elimination of the complexity of DC amplification as well as suppressing low-frequency noise of the amplification circuit.

The low power RF detector and amplifier stage 341, depicted in FIG. 23, realizes detector and amplifier action using the same bias current from the DC power supply 384. This embodiment results in high signal gain and sensitivity, superior noise figure, as well as conserving battery load current. One additional advantage is fewer electronic parts and, therefore, a lower manufacturing cost for the circuit. In one embodiment of the present invention, the low power detector and amplifier stage 341 makes use of a single diode 342 and transistor 344 biased in a common base configuration, arranged as depicted in FIG. 23. In this configuration, negative voltage swing of the signal from the antenna is harvested by the non-heterodyne receiver. Other embodiments of the present invention may use multiple diodes, as will be described below. The combined RF detector and amplifier circuit 341 reuses the bias current between transistor 344 and diode detector 342, reducing operating current requirement. Moreover, in this configuration, detector 342 and transistor 344 are optimally impedance-matched because the transistor's base-emitter (BE) diode is operating at the same current as diode detector 342. Thus, both present almost identical dynamic resistance to each other. The matched impedances result in a more efficient energy transfer between diode detector 342 and transistor 344, allowing higher power gain and achieving essentially the lowest noise figure attainable for the given low level of bias current. Accordingly, the SNR of the low power detector and amplifier 341 is significantly enhanced, compared with circuits available through ordinary art. This circuit can also be implemented using other types of transistors (e.g. FET, MOSFET, etc.).

In another embodiment of the present invention, the low power detector and amplifier stage may include more than one detector diode that can be biased by splitting the emitter current of transistor 344 to combine signals from multiple antennae. Such a detector and amplifier stage is useful for realizing one or more of the following: omni-directional RF communication, antenna diversity, space diversity, etc.

In another embodiment of the present invention, the low power detector and amplifier circuit 341 may omit diode detector 342. The base-emitter junction of transistor 344 provides a non-linear transfer function to substitute for diode detector 342, while also acting as a transistor amplifier (operating in class A-B mode). This configuration does not involve 3 db power coupling loss. Further, because the bias voltage for powering the diode detector is not present in this embodiment, the voltage saved can instead be used to increase the collector load resistance of the transistor amplifier, providing even higher gain. It also has the advantage of reduced parts cost.

In one exemplary embodiment of the present invention, which includes the low power detector and amplifier 341 depicted in FIG. 23, suitable values for resistances R17, R 31 and R34, and the bias current provided to transistor 344 may be selected to achieve a total gain of 30 dB.

In yet another embodiment of present invention, the low power detector and amplifier 341 includes multiple diode detectors 342 that can be connected in parallel to the emitter of transistor 344, thus enhancing the power sensitivity of the circuit with almost no gain penalty due to spurious shunting of signal by the dynamic impedance of other diodes. Another configuration may use multiple diode detectors connected in series, which even though requiring a higher drive voltage, conserves the battery load current. Consequently, a lower collector voltage of transistor 344 is available for transistor stage gain. Another configuration may connect the diode detectors in parallel for a lower operating voltage. Such a configuration is particularly suited for applications in which lower bias voltages are desired (e.g., 3.6 V).

The bootstrap integrating detector 380 depicted in FIG. 23 includes transistors 381 and 382, connected as shown, and powered by voltage supply 384. In the embodiment depicted in FIG. 23, the bias voltage at the base terminal of transistor 381 is bootstrapped to the detector's output by bias voltage established by the base-emitter voltage ($V_{BE}$) of 382 and biased through resistor $R_{32}$. Resistor $R_{32}$ also prevents shorting the AC signal with the base-emitter junction of transistor 382, thereby isolating the AC signal from bias loading. This biasing arrangement sensitizes the base-emitter junction of 381 by moving the operating point very close to the diode cut-in point in the diode's voltage-current (V/I) characteristic curve. In the embodiment depicted in FIG. 23, transistor 382 and diode 382 are wired as a "follower" (i.e., the voltage of the base terminal "follows" the voltage of the emitter terminal) across R35. The result is that the base-emitter junction of transistor 381 is biased at a constant voltage at the onset of the junction's conduction, even when the voltage at the emitter terminal in transistor 381 is being raised by the integration of the AC signal. This effect results in the base swing of transistor 381 capturing a larger portion of the peak-to-peak energy in the AC signal entering the bootstrap integrating detector

380. Capacitor $C_{43}$ and resistor $R_{35}$ introduce a time-constant in the circuit that allows for integration of the signal. This circuit consumes negligible current when there is no input signal.

Figure 24:
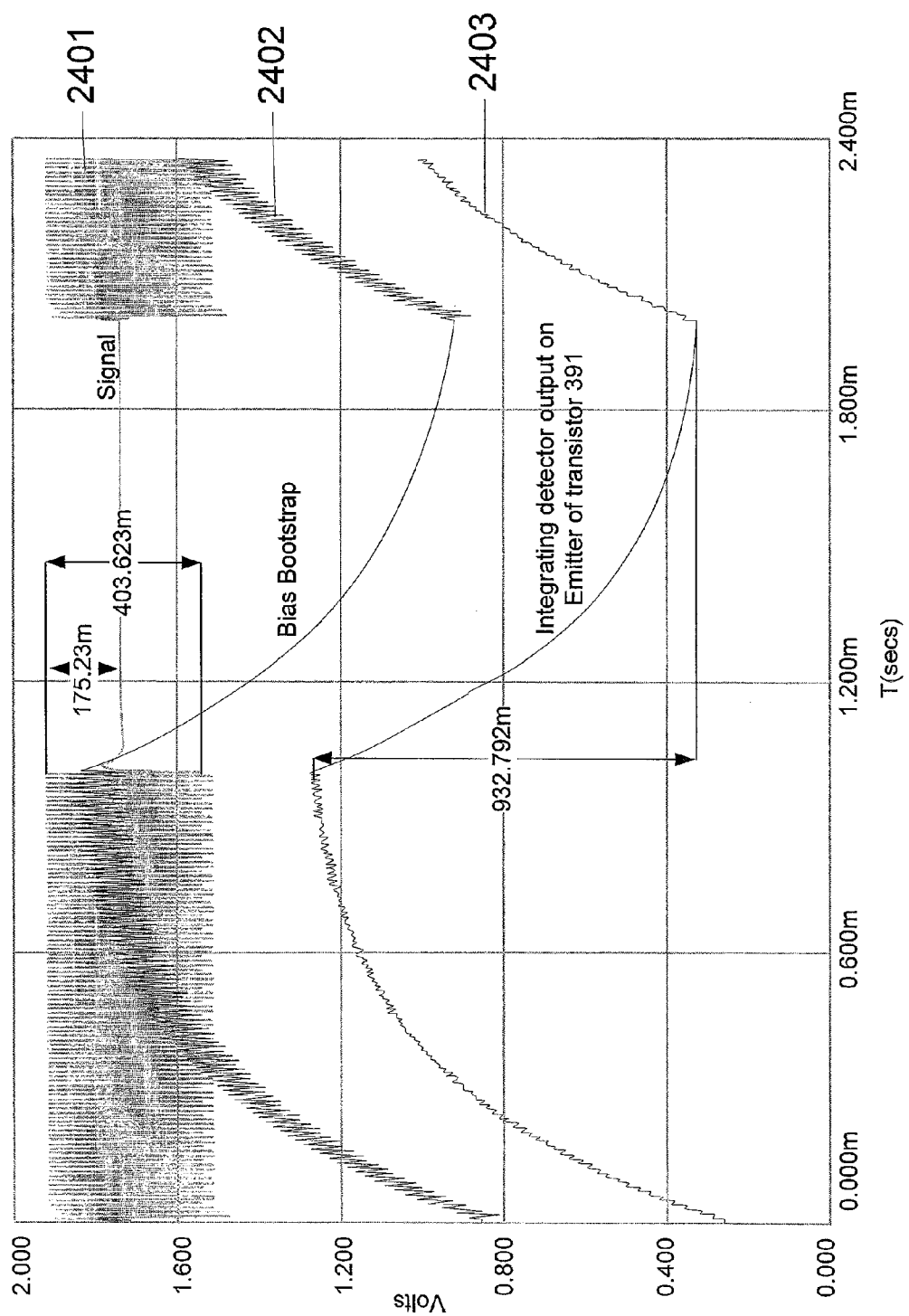
FIG. 24 shows computer simulated signal waveforms that explain the operation of the integrating bootstrap detector circuit in FIG. 23, in accordance with one embodiment of the present invention.

FIG. 24 shows a simulation result of the effect produced by the bootstrap integrating detector of FIG. 23. 2401 shows the trace in time of an AC signal with a preselected subcarrier frequency $f_{sc}$, as measured at a point before capacitor $C_{37}$. Trace 2402 shows the voltage at the base terminal of transistor 382 and trace 2403 shows the voltage at the emitter terminal of transistor 381. Notice that, aside from transient effects, the difference in voltage between traces 2402 and 2403 at any given time is approximately constant. In the embodiment of the present invention depicted in FIG. 24, this value corresponds to approximately 0.6 V, which is the conduction edge voltage of a typical silicon diode. Other voltage values can be used, depending on the specific model and type of transistor used in a particular application.

FIG. 24 demonstrates that an AC signal with a peak-to-peak value $V_1$ of approximately 400 mV, can be integrated into a signal with a peak value Vi of approximately 930 mV. By comparison, a perfect diode detector would produce an output of only 200 mV for the same AC signal input. Thus, the bootstrap integrating detector shown in FIG. 23 provides an improvement of several times the best sensitivity that can be obtained by state-of-the-art devices.

In one mode of operation, an ELP radio communication system includes two appliances, A and B. The non-heterodyne receiver of the first appliance (i.e. Appliance A) may decode and identify, from a communication request message sent by the second appliance (i.e. Appliance B), the class of appliance B. The message from appliance B may be broadcast and may specify which one of several appliances it intends to communicate with, or it may specify the general class (type) to which appliance A belongs. Appliance A, upon receiving the message using the non-heterodyne receiver, initiates communication with the appliance B, using a higher performance radio system.

To summarize, the Tier-1 non-heterodyne receiver in an ELP transceiver may be used as a low-cost pager receiver to allow a potential compatible communication partner to wake up the Tier-2 radio circuits of the ELP transceiver for efficient communication. An example of such a system includes a security access device and a tracking device. In the security access device, a battery operated door opener, for example, may wait for a wireless key. Because of the low-power requirements of the ELP transceiver, the battery that operates the door opener may provide power for a year or more without recharging or replacement. Similarly, a tracking device, which may be used in mobile property management, waits for an inquiry of its location. Again, the low-power requirements allow the battery in such a tracking device to operate over a considerably longer period of time than previously possible.

Therefore, the present invention provides an efficient energy footprint for low communication duty-cycle applications by significantly reducing the average radio-communication power footprint with low communication latency. In battery-operated applications, the present invention significantly lengthens the time between battery recharge or replacement or, equivalently, the present invention enables the use of smaller, lower-rating, or less expensive batteries. The present invention therefore provides on-demand, asynchronous communication that uses the available RF spectrum and RF range more efficiently. Consequently, the base system does not saturate and allows many more devices to co-exist at a higher device population density. Because of the low-power requirement of the ELP transceiver, portable applications, including such an ELP transceiver may be powered by non-conventional, lower power or lower cost sources of power (e.g. solar, vibration harvesting, and thermopile).

In some applications, the present invention allows not only robust low latency asynchronous communication, but also the ability to asymmetrically re-distribute the average energy budget amongst the communication circuits. For example, the Tier-1 transmitter's operative duration or power level could be adjusted, so that the receiver (e.g., an AM receiver) can operate at a higher bandwidth and/or a greater amplification.

This invention is applicable to a wide variety of electromagnetic wave communication systems including those in the infrared and optical bands.

As will be appreciated, the invention is capable of other and different embodiments and its several details are capable of modifications in various respects that will be obvious to one skilled in the art, all without departing from the invention. Accordingly, the drawings and the descriptions included herein are to be regarded as illustrative in nature and not restrictive.

The invention claimed is:

1. A radio communication system comprising a first radio communication device which comprises:
   a first communication circuit configured to receive a communication request and to provide a wake-up signal upon receiving the communication request;
   wherein the first communication circuit comprises a first receiver circuit for demodulating and amplifying the communication request without using a RF (radio frequency) local oscillator;
   wherein the first receiver circuit comprises:
      a detector demodulator diode for demodulating the communication request, the detector demodulator diode comprising an output for providing a demodulated signal obtained from the communication request;
      a common base transistor amplifier comprising an input for receiving the demodulated signal obtained from the communication request, the input being at an emitter of the common base transistor amplifier; and
      a circuit coupling the output of the detector demodulator diode to a base-emitter junction of the common base transistor amplifier;
   wherein the first radio communication device further comprises a second communication circuit comprising a receiver, a transmitter, or a transceiver, having an operating state and a power saving state, wherein said second communication circuit switches from the power saving state to the operating state upon receiving the wake-up signal.

2. A radio communication system as in claim 1, wherein the receiver, the transmitter or the transceiver of the second communication circuit comprises a heterodyne receiver, a heterodyne transmitter, or a heterodyne transceiver.

3. A radio communication system as in claim 1, wherein the first receiver circuit is a part of a transceiver.

4. A radio communication system as in claim 1, further comprising a second radio communication device for communicating with the first radio communication device, wherein the second radio communication device comprises:
   a first communication circuit comprising a transmitter, configured to transmit the communication request; and
   a second communication circuit comprising a receiver, a transmitter, or a transceiver, having an operating state and a power saving state, wherein after the transmitter of the second radio communication device transmits the communication request, said second communication circuit of the second radio communication device switches from its power saving state to its operating state.

5. A radio communication system as in claim 4, wherein the transmitter in the first communication circuit of the second radio communication device comprises an oscillator based on a negative resistance device selected from a group consisting of a tunnel diode, a Gunn diode, an IMPATT (IMPact ionization Avalanche Transit-Time) diode, and a TRAPATT (TRApped, Plasma Avalanche Triggered Transit) diode.

6. A radio communication system as in claim 4, wherein the first communication circuit of the second radio communication device further comprises a receiver that does not have a radio frequency (RF) local oscillator.

7. A radio communication system as in claim 4, wherein one of the first and second radio communication devices is a stationary device and the other one of the first and second communication devices is a mobile device; and wherein the communication request comprises a composite signal modulated by one or more modulation techniques selected from the group consisting of: amplitude shift keying (ASK), on-off keying (OOK), frequency shift keying (FSK), pulse width modulation (PWM), pulse position modulation (PPM), pulse code modulation (PCM), pulse amplitude modulation (PAM) and direct sequence spread spectrum (DSSS), presence or absence of a tone, and presence or absence of an RF signal with respect to a threshold.

8. A radio communication system as in claim 1, wherein the first receiver circuit is operable to determine that the communication request is directed to the first radio communication device.

9. A radio communication system as in claim 1, wherein the receiver in the second communication circuit is a higher performance radio receiver than the first receiver circuit.

10. A radio communication system as in claim 1, wherein the communication request is to be provided on a signal modulated under a heterogeneous signaling scheme comprising one or more modulation techniques selected from the group consisting of: amplitude shift keying (ASK), on-off keying (OOK), frequency shift keying (FSK), pulse width modulation (PWM), pulse position modulation (PPM), pulse code modulation (PCM), pulse amplitude modulation (PAM) and direct sequence spread spectrum (DSSS), presence or absence of a tone, and presence or absence of an RF signal with respect to a threshold.

11. A radio communication system as in claim 1, wherein the first receiver circuit is configured to be powered at predetermined time intervals.

12. A radio communication system as in claim 1 configured so that, upon detecting the communication request, the first receiver circuit operates at a higher gain or activates a preselected filter or demodulator.

13. A radio communication system as in claim 1 wherein the communication request is to be modulated on a subcarrier at a predetermined frequency and wherein the first receiver circuit comprises a crystal resonator for providing sub-carrier frequency detection.

14. A radio communication system, comprising a first radio communication device, which comprises:
a first communication circuit configured to receive a communication request and to provide a wake-up signal upon receiving the communication request;
wherein the first communication circuit comprises a first receiver circuit for demodulating and amplifying the communication request without using a RF (radio frequency) local oscillator;
wherein the first radio communication device further comprises a second communication circuit comprising a receiver, a transmitter, or a transceiver, having an operating state and a power saving state, wherein said second communication circuit switches from the power saving state to the operating state upon receiving the wake-up signal;
wherein the communication request is modulated on a subcarrier of a predetermined frequency ($f_{sc}$), and the first receiver circuit comprises a detector demodulator diode configured to recover the communication request modulated on the subcarrier.

15. A radio communication system as in claim 14, wherein the first receiver circuit is operable to determine that the communication request is directed to the first radio communication device.

16. A radio communication system as in claim 14, wherein the communication request is to be provided in a composite signal, the composite signal comprising a continuous wave (CW) modulation pulse followed by modulation using one or more of the following modulation techniques:
 a. amplitude-modulation (AM);
 b. single tone modulation;
 c. digital data encoding using at least one of: amplitude-shift keying (ASK); On-Off Keying (OOK); frequency-shift keying (FSK); pulse code modulation (PCM); pseudorandom-noise (PN-Code) technique using on-off keying (OOK) or amplitude-shift keying (ASK);
 d. multiple tones in time sequence;
 e. multiple tones at the same time;
wherein the receiver is configured to verify the subcarrier's frequency in the CW pulse and demodulate the composite signal.

17. A radio communication system as in claim 14 wherein the first radio communication device further comprises an antenna for receiving the communication request;
wherein the detector demodulator diode is coupled to receive the communication request from the antenna without amplification of the communication request between the antenna and the detector demodulator diode;
wherein the first radio communication device further comprises an amplifier for amplifying the communication request demodulated by the detector demodulator diode but modulated on the subcarrier.

\* \* \* \* \*